(12) United States Patent
Stern et al.

(10) Patent No.: US 8,498,350 B2
(45) Date of Patent: Jul. 30, 2013

(54) COMMUNICATION SYSTEM INCORPORATING PHYSICAL LAYER WAVEFORM STRUCTURE

(75) Inventors: Martin A. Stern, Fort Wayne, IN (US); Thomas E. Young, Fort Wayne, IN (US); Mark A. Gloudemans, Fort Wayne, IN (US); David E. Mussmann, Spencerville, IN (US)

(73) Assignee: Raytheon Company, Waltham, MA (US)

( * ) Notice: Subject to any disclaimer, the term of this patent is extended or adjusted under 35 U.S.C. 154(b) by 574 days.

(21) Appl. No.: 12/762,619

(22) Filed: Apr. 19, 2010

(65) Prior Publication Data

US 2010/0265999 A1  Oct. 21, 2010

Related U.S. Application Data

(60) Provisional application No. 61/170,443, filed on Apr. 17, 2009, provisional application No. 61/172,452, filed on Apr. 24, 2009.

(51) Int. Cl.
*H04K 1/10* (2006.01)
*H04L 27/28* (2006.01)

(52) U.S. Cl.
USPC ........... 375/260; 375/267; 370/203; 370/208; 370/210

(58) Field of Classification Search
USPC ................... 375/260, 267, 299; 370/203–211
See application file for complete search history.

(56) References Cited

U.S. PATENT DOCUMENTS

| 5,883,921 | A  | * | 3/1999 | Andren et al. ............... 375/150 |
|---|---|---|---|---|
| 6,700,919 | B1 |   | 3/2004 | Papasakellariou |
| 6,874,096 | B1 | * | 3/2005 | Norrell et al. ............... 713/400 |
| 2003/0053493 | A1 |   | 3/2003 | Mobley et al. |
| 2003/0053522 | A1 |   | 3/2003 | Hayoun et al. |
| 2003/0162518 | A1 |   | 8/2003 | Baldwin et al. |
| 2005/0249319 | A1 |   | 11/2005 | Suh et al. |
| 2005/0254596 | A1 |   | 11/2005 | Naguib |
| 2006/0121862 | A1 |   | 6/2006 | Cornwall et al. |
| 2006/0210070 | A1 |   | 9/2006 | Reznik et al. |
| 2007/0297612 | A1 | * | 12/2007 | Feder et al. .................... 380/270 |
| 2008/0002645 | A1 | * | 1/2008 | Seki et al. ...................... 370/338 |
| 2008/0019315 | A1 | * | 1/2008 | Machida ........................ 370/330 |
| 2008/0232497 | A1 | * | 9/2008 | Hart et al. ...................... 375/260 |
| 2008/0291821 | A1 |   | 11/2008 | Dent |
| 2009/0086752 | A1 |   | 4/2009 | Anderson et al. |
| 2010/0208834 | A1 | * | 8/2010 | van Zelst et al. .............. 375/267 |
| 2010/0266062 | A1 |   | 10/2010 | Mussmann et al. |

FOREIGN PATENT DOCUMENTS

WO   2009018655 A1   2/2009

* cited by examiner

*Primary Examiner* — Curtis Odom
(74) *Attorney, Agent, or Firm* — Lando & Anastasi, LLP

(57) ABSTRACT

A wireless radio transceiver system configured to transmit and receive a communications signal waveform having a time division multiple access physical layer structure and which includes a sequence of orthogonal frequency division multiple access symbols. The transceiver provides transmit diversity through space-time coding and the use of orthogonal channel probes from each transmitter. The waveform is packet based and contains a packet header definition that supports local receiver synchronization. Examples of the waveform also incorporate transmission security features.

23 Claims, 21 Drawing Sheets

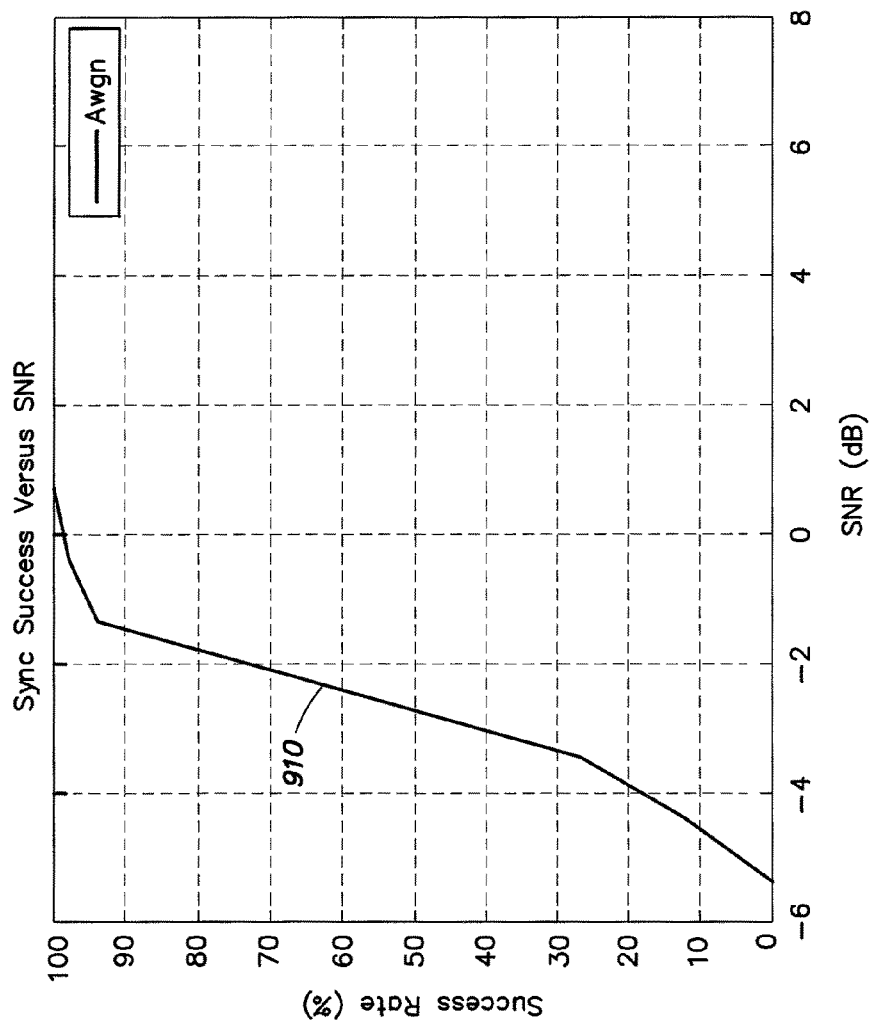

COMMUNICATION SYSTEM INCORPORATING PHYSICAL LAYER WAVEFORM STRUCTURE

CROSS REFERENCE TO RELATED APPLICATIONS

This application claims priority under 35 U.S.C. §119(e) to U.S. Provisional Application No. 61/170,443 entitled COMMUNICATION WAVEFORM PHYSICAL LAYER STRUCTURE filed on Apr. 17, 2009 and to U.S. Provisional Application No. 61/172,452 entitled COMMUNICATION WAVEFORM PHYSICAL LAYER STRUCTURE filed on Apr. 24, 2009, both of which are herein incorporated by reference in their entireties.

FEDERALLY SPONSORED RESEARCH

This invention was made with government support under Contract No. H92222-08-C-0017 awarded by the United States Special Operations Command (USSOCOM). The Government has certain rights in this invention.

BACKGROUND

1. Field of Invention

The present invention relates to communications systems and, more particularly, to a physical layer structure of a waveform for use in wireless communications systems.

2. Discussion of Related Art

Most existing communication waveforms used in conventional wireless telecommunication systems generally rely on network topologies that have a fixed infrastructure, such as, for example, a "hub and spoke" network topology used by most cellular communications networks. The hub and spoke network topology typically comprises a fixed central node that is configured to coordinate the operation of other nodes in the network. One example of a hub-spoke network topology is a WI-FI system based on the IEEE 802.11 standard.

Some communication systems however use informal infrastructures rather than fixed infrastructures. For example, a telecommunication system having no formal structure is a Mobile-Ad-hoc Network (MANET). A MANET is a self-configuring network of mobile nodes connected by wireless links. Each node in a MANET is generally free to move independently in any direction and therefore its ability to communicate with other nodes may change frequently. The nodes in a MANET may be transported by people, vehicles, projectiles or any of numerous other mobile platforms. Existing waveforms that rely on fixed infrastructure are not designed to support high relative velocity between network nodes, which can frequently occur in a MANET environment. In addition, because the nodes of a MANET are generally moving in an arbitrary manner, the wireless link conditions may change frequently due to changing environmental conditions as the nodes move, and existing waveforms are ill-equipped to deal with such rapidly changing link conditions.

SUMMARY OF THE INVENTION

Aspects and embodiments are directed to a communications signal waveform that can provide reliable communication between nodes in a Mobile Ad-Hoc Network (MANET) over large distances, for example, up to approximately 100 miles and with high relative velocities between nodes. In addition, embodiments of the waveform incorporate transmission security features; include features to provide high link availability, and/or support bandwidth allocation of multiple 1.2 megahertz (MHz) segments for compatibility with military spectral planning. Conventional waveforms do not provide these features and characteristics, and therefore the waveform according to embodiments of the present invention may offer significant benefits and advantages over conventional waveforms.

According to one embodiment, a transceiver configured to transmit and receive a packet-based waveform over at least one communication channel comprises an input configured to receive data to be transmitted, an antenna configured to transmit a transmit signal comprising the waveform and to receive a received signal comprising the waveform, and a modulator coupled to the input and configured to modulate the data to provide modulated data. The transceiver further comprises a control processor module configured to generate each packet of the waveform from the modulated data as a sequence of orthogonal frequency division multiplexed (OFDM) symbols, the control processor including a Fourier transform module configured to generate each symbol by computing an inverse fast Fourier transform of the modulated data, a pilot channel encoder configured to embed periodic pilot symbols within a payload segment of each packet of the waveform, and a synchronization module configured to acquire a time of arrival of the received signal by individually correlating each symbol of a preamble segment of the waveform to provide a series of correlations and summing the series of correlations.

In one example, wherein the waveform has a time division multiple access physical layer structure, the transceiver further comprises a global positioning system (GPS) input configured to receive an external GPS signal, and a timing module configured to receive the GPS signal and to synchronize the waveform to time slots within the communication channel based on the GPS signal. In another example, the transceiver further comprises a demodulator configured to demodulate the received signal. In one example wherein each packet of the waveform comprises a packet self discovery segment that contains information descriptive of the data and the waveform, the demodulator is configured to extract the information and perform demodulation of the data based on the information. This information may include, for example, at least one of a modulation type, a packet size, and a forward error correction code rate. In one example, the packet self discovery segment comprises three non-repeating OFDM symbols. The control processor module may be further configured to implement windowed cyclic extension on each symbol. In another example, the synchronization module is further configured to compute a corrected frequency estimate for each symbol in the preamble segment of the waveform of the received signal, wherein the synchronization module comprises a plurality of complex filters configured to compute a frequency error for each symbol in the preamble segment of the waveform of the received signal based on an average rotation vector from symbol to adjacent symbol, and wherein the synchronization module is configured to compute the corrected frequency estimate based on the frequency error. In one example, the preamble segment of the waveform comprises twelve non-repeating OFDM symbols. The transceiver may further comprise a channel estimation module configured to remove phase shift and amplitude scaling in the received signal based on the pilot symbols embedded in the waveform. The transceiver may further be configured for multiple input multiple output operation, wherein the antenna comprises a plurality of antennas, and may comprise an Alamouti encoder configured to implement space-time block coding on the transmit signal. The transceiver may further comprise a transmission security encoder configured to encode at least some segments of the waveform with a pseudorandom security sequence.

Another embodiment is directed to a method of wireless communication in a radio transceiver network, the method comprising receiving a signal to be transmitted by a radio transmitter in the network, the signal including data, modulating the signal to provide a modulated signal, generating a packet-based waveform based on the modulated signal, each packet of the waveform comprising a preamble segment, a packet self discovery segment and a payload segment that includes the data, and each packet comprising a sequence of orthogonal frequency division multiplexed symbols, embedding pilot symbols within the payload segment of the waveform, and transmitting the waveform with the radio transmitter.

According to one embodiment of the method, generating the waveform includes generating the sequence of OFDM symbols by performing inverse fast Fourier transform (iFFTs) on the modulated signal to generate each OFDM symbol as an iFFT. In one example, generating each OFDM symbol includes performing the inverse fast Fourier transform to generate the iFFT, appending a cyclic prefix and a cyclic postfix to the iFFT to provide an extended iFFT, and multiplying the extended iFFT by a window function to generate the OFDM symbol. In one example, the window function is a raised cosine window. The method may further comprise encoding at least come segments of the waveform with a pseudorandom security sequence prior to transmitting the waveform. In one example, the method further comprises receiving the waveform with a radio receiver, and acquiring a time of arrival of the waveform at the radio transceiver by individually correlating each symbol of the preamble segment of the waveform to provide a series of correlations and summing the series of correlations. The method may further comprise determining a frequency error in the waveform received at the receiver, including computing a frequency error for each symbol in the preamble segment of the waveform based on average rotation vectors from symbol to adjacent symbol. In another example, the method further comprises performing Alamouti space-time block coding on the waveform to provide a plurality of coded waveforms for transmission. In this example, transmitting the waveform includes transmitting the plurality of coded waveforms using a plurality of individual antennas.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 9A is a graph of time synchronization success rate as a function of signal-to-noise ratio for an example of a waveform having the preamble structure of FIG. 7, according to aspects of the invention;

DETAILED DESCRIPTION

Figure 1:
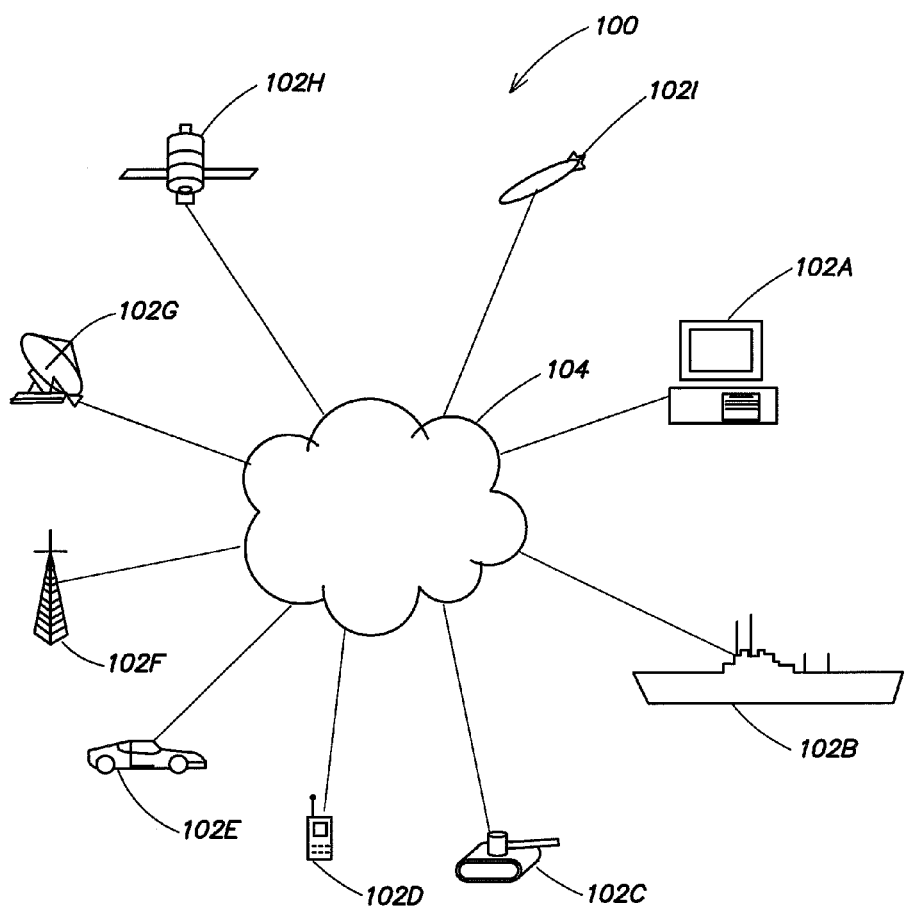
FIG. 1 is a diagram of one example of a system for communicating via Radio over Internet Protocol.

As discussed above, some wireless communications applications employ networks that do not have a fixed infrastructure. Some example applications include, but are not limited to, mobile tactical communications receivers, wireless mobile ad-hoc networks (MANET), and networks implementing Radio over Internet Protocol (RoIP). Today, RoIP is widely employed to communicate information including voice, data and video across a network. FIG. 1 illustrates a high-level view of an embodiment of a system 100 for communicating via RoIP. The system 100 can include a plurality of nodes 102 connected via a network 104. The plurality of nodes can include any communication device accessible via Internet Protocol. These can include two-way radios, computers (laptops, desktops, etc.), software running on a computer (for example, a Skype phone) a personal digital assistant (PDA), smartphone, etc. According to one embodiment, each node includes a transmitter and/or a receiver for transmitting or receiving communications over the network, respectively. The transmitting or receiving node may be provided by a wide variety of properly equipped devices including mobile devices such as ships, land-based military vehicles (humvees, tanks, etc.), personal vehicles, missiles, helicopters and airplanes as some examples. Further, the network can communicate via radio towers (including cell towers) and satellite communications.

According to various embodiments, the network 104 includes wireless networks, hardwired networks, or a combination of wireless and hardwired networks. In addition, embodiments can communicate over wide area networks (WAN), local area networks (LAN) or a combination of WANs and LANs. Further, the network 104 can include a private network, a public network (for example the Internet), or a combination of private and public networks. In accordance with one embodiment, the network employs a Mobile WiMax communication standard, for example, IEEE 802.16e. According to other embodiments, the network can employ other communications standards, for example those networks suitable for packet transmission.

Aspects and embodiments of the invention are directed to a physical layer structure of a communications signal waveform that can be used in a network such as network 104 discussed above. Unlike conventional waveforms that rely on fixed network infrastructures, the waveform is designed to be compatible with informal networking, such as in MANET, and can provide reliable communications between nodes over a range of up to approximately 100 miles, with high relative velocity between nodes and over diverse propagation environments ranging from dense urban environments to line of sight links. The waveform provides transmit diversity through space-time coding and the use of orthogonal channel probes from each transmitter, as discussed further below, and may support 1.2 MHz allocation segments for spectral planning, as well as transmission security features. Embodiments of the waveform include a time division multiple access (TDMA) physical layer using external global positioning satellite system (GPS) synchronization. The waveform is packet based and contains a packet header definition that supports robust receiver synchronization despite time and frequency ambiguities due to large relative node velocities, and adaptive data rate functionality through encoding information that allows the transmitter to unilaterally modify the data rate of each packet, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2A:
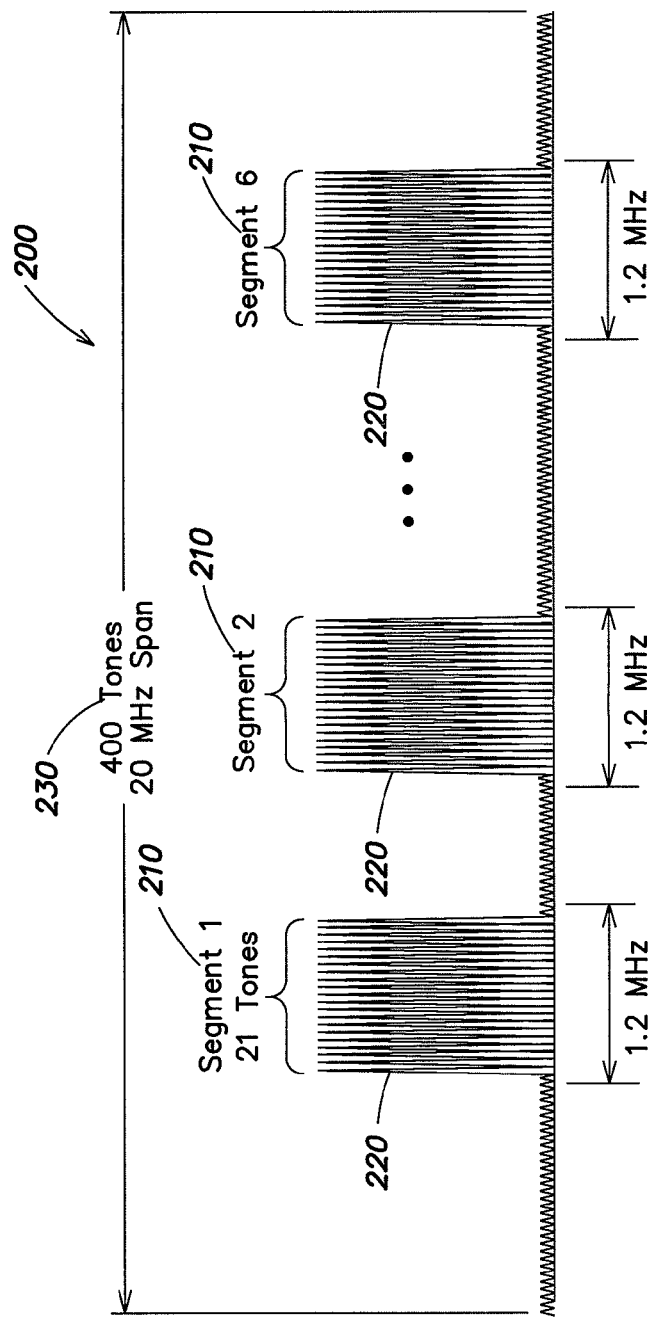
FIG. 2A is a diagram of one example of an OFDM waveform structure according to aspects of the present invention.
Figure 2B:
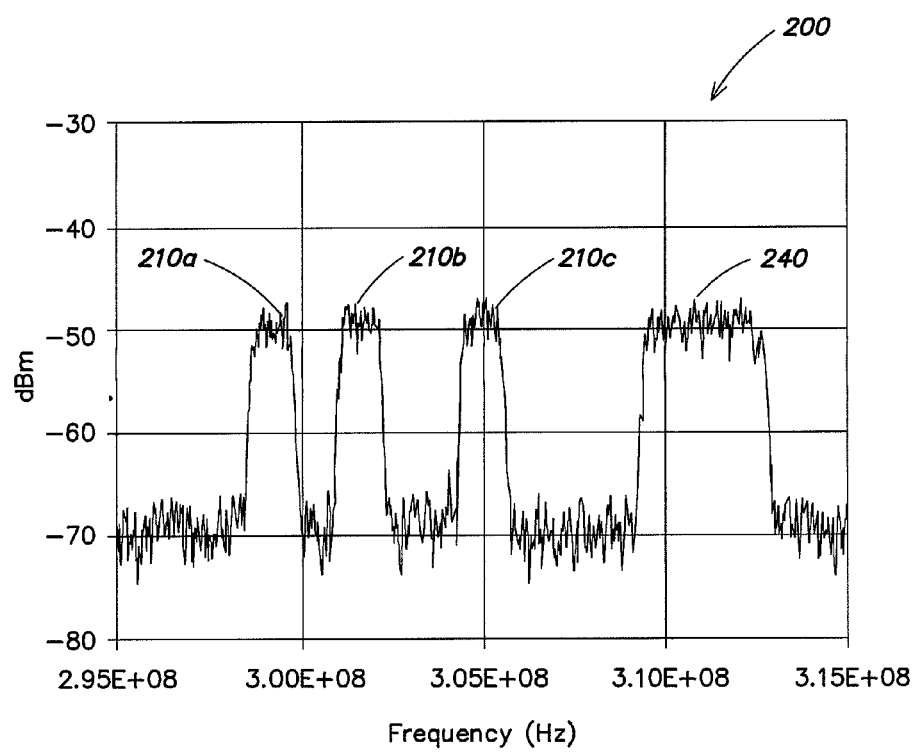
FIG. 2B is a representation of one example of a six segment channel allocation of the OFDM waveform of FIG. 2B, according to aspects of the invention.

According to one embodiment, a communications signal waveform (hereinafter referred to as the waveform) is implemented using an orthogonal frequency division multiplexed (OFDM) symbols with physical layer time division multiple access (TDMA) channel access. The physical layer packets are constructed from sequences of OFDM symbols with periodic channel probes, as discussed further below. Referring to FIG. 2A, there is illustrated one example of an OFDM waveform 200 in accordance with one embodiment. In one example, the OFDM waveform operates in up to six 1.2 MHz bandwidth channel segments 210, as shown in FIG. 2A. Bandwidth allocation of multiple 1.2 MHz segments allows for compatibility with military spectral planning requirements; however it is to be appreciated that segments of other sizes may be used. In addition, the waveform may incorporate more or fewer than six channel segments 210. In one example, each 1.2 MHz channel segment 210 includes 21 contiguous carriers 220, referred to as "tones," with a 50 kHz tone spacing. Again, it is to be appreciated that the number of tones as well as the tone spacing may be varied according to user specifications or other design requirements as are not limited to the specific examples given herein. In one example, the OFDM waveform structure is implemented with an instantaneous bandwidth, or total span, 230 of 20 MHz or 400 tones within which the six channel segments 210 are allocated. It is to be appreciated that the total span 230 may be greater or less than 20 MHz depending, for example, on the overall system design parameters and specifications. The channel segments 210 may be arbitrarily located anywhere within the 20 MHz span 230, provided that no two segments overlap. The channels segments may be contiguous or not. FIG. 2B illustrates an example of a six segment channel allocation in which three of the segments 210a, 210b and 210c are not contiguous and three segments are contiguous, as illustrated by signal portion 240.

Figure 3A:
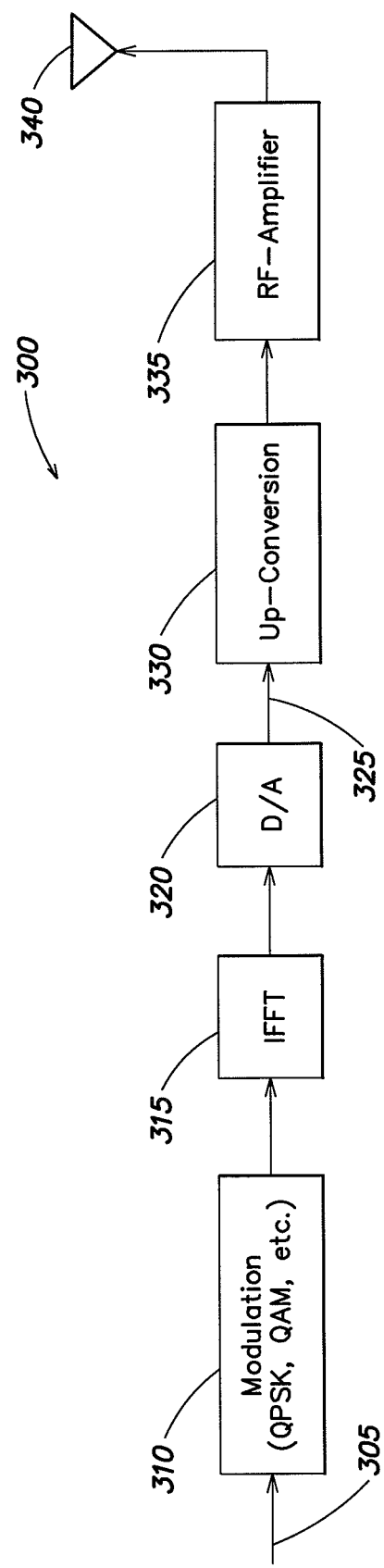
FIG. 3A is a block diagram of a transmitter configured to generate an OFDM waveform according to aspects of the invention.

According to one embodiment, the OFDM symbols are generated using an inverse fast Fourier transform (iFFT) algorithm. Referring to FIG. 3A there is illustrated a block diagram of one example of a transmitter configured to generate the OFDM symbols. The transmitter 300 receives input data 305 that is to be transmitted, and a modulator 310 modulates the data according to a chosen modulation scheme such as, for example, Binary Phase Shift Keying (BPSK), Quadrature Phase Shift Keying (QPSK), or Quadrature Amplitude Modulation (QAM). An IFFT module 315 computes the iFFT of the modulated data, thereby creating a corresponding OFDM symbol and converts the modulated data from the frequency domain into the time domain. A digital to analog converter 320 converts the signal from the iFFT module 315 into an analog baseband OFDM signal 325. The baseband OFDM signal is up-converted in frequency by module 330 in preparation for wireless transmission, then amplified using an RF amplifier 335 and provided to an antenna 340 for transmission. Similarly, on the receiver side, the signal is received by the antenna 340, amplified using a low noise amplifier 345, and down-converted in frequency by module 350 to provide the baseband OFDM signal 355. An analog-to-digital converter 360 is used to convert the OFDM signal 355 into digital OFDM symbols and an FFT module 370 computes the fast Fourier transform (FFT) of the OFDM symbol to convert the signal from the time domain into the frequency domain. The signal is then demodulated using demodulator 375 to provide the output data 380. In one example, the receiver and transmitter systems are implemented as field programmable gate arrays (FPGAs); however, it is to be appreciated that other implementations are also possible.

Figure 4:
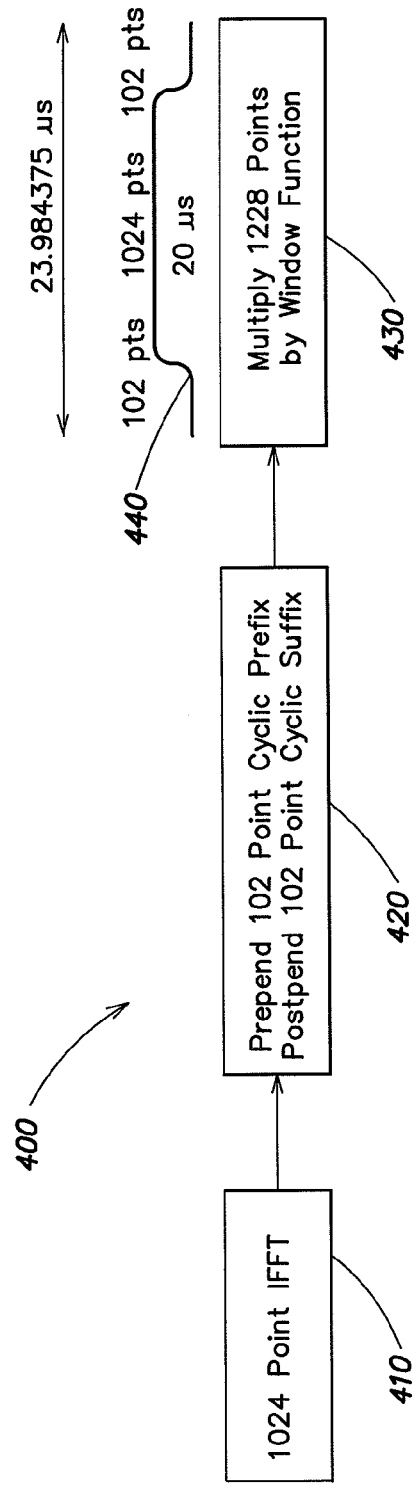
FIG. 4 is a block diagram of a process for constructing a windowed OFDM symbol according to aspects of the present invention.

In one embodiment, each OFDM symbol is created using a 1024 point iFFT. Using the iFFT provides an efficient implementation for the OFDM waveform and provides flexibility to easily adapt the waveform to different modulation schemes and/or data rates to support changing link conditions. In one example, each iFFT (OFDM symbol) includes a windowed cyclic extension to reduce inter-symbol interference due to multipath effects in the wireless link. Cyclic extension includes appending a prefix and a postfix to each symbol, as discussed further below. Referring to FIG. 4, there is illustrated a block diagram of a process 400 for constructing a windowed iFFT to generate an OFDM symbol. This process may be used for each symbol in the physical layer packet. In a first step 410, the iFFT module 315 computes a 1024 point iFFT to generate the corresponding OFDM symbol. In a next step 420, the cyclic extension is implemented. In one example, the cyclic extension includes appending a 102 point cyclic prefix and a 102 point cyclic postfix to the symbol created at step 410, resulting in a 1228 point extended iFFT. The 1228 point extended iFFT is then multiplied by a window function (step 430) to improve spectral characteristics of the symbol. In one example, the window function 440 is a raised cosine window, as illustrated in FIG. 4. In one example, for a 20 microsecond (μs) base 1024 iFFT and two 102 point extensions, cyclic extension was shown to provide approximately 2 μs of multi-path delay mitigation.

Figure 5:
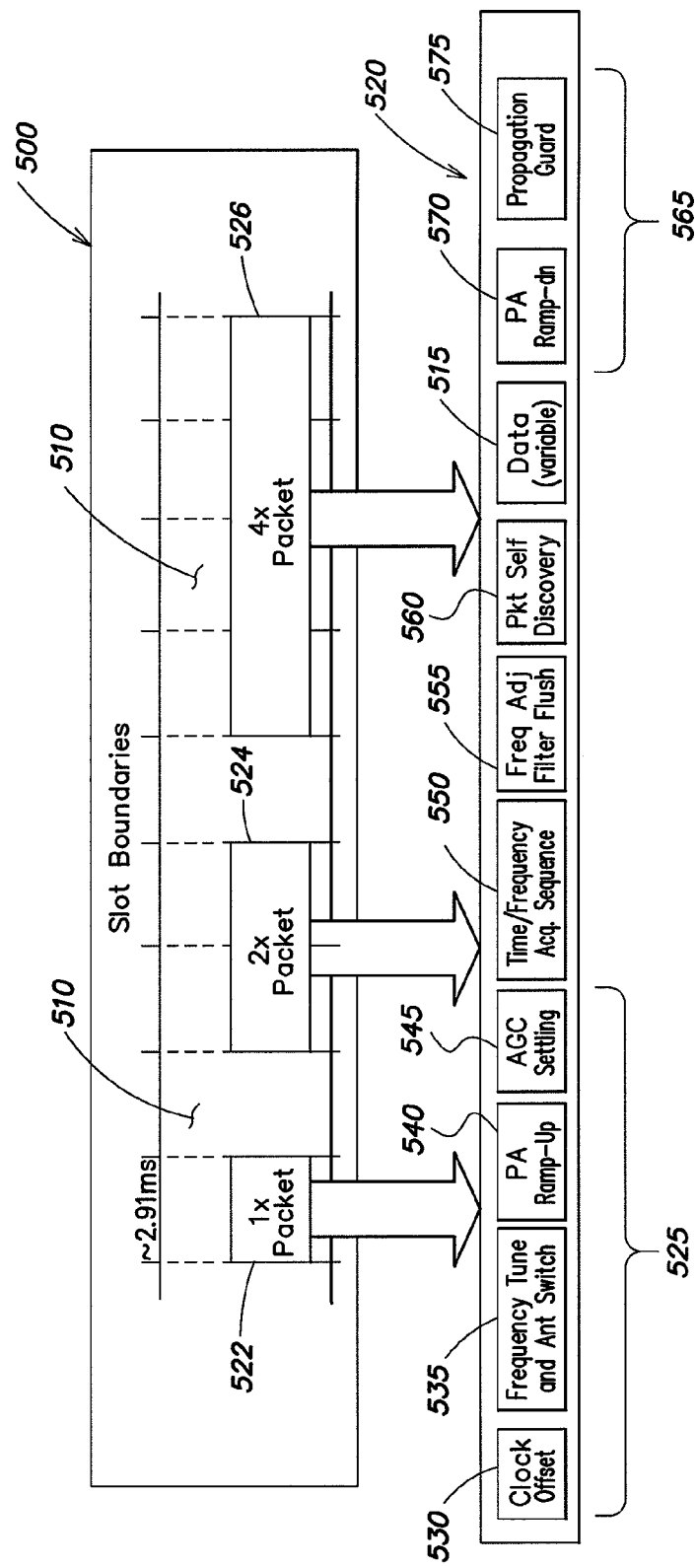
FIG. 5 is a block diagram showing an example of a TDMA channel access structure with a physical layer packet structure for the waveform according to aspects of the present invention.

As discussed above, the waveform includes a TDMA channel access structure in which a communication channel of a given frequency or range of frequencies is divided into different time slots. One example of a TDMA channel access structure is illustrated in FIG. 5. The channel 500 is divided into a plurality of time slots 510. In one example, each time slot 510 has a duration of 2.91 milliseconds (ms), resulting in 344 time slots per second; however, it is to be appreciated that the length of each time slot may be greater or less than 2.91 ms. In one embodiment, the slots are synchronized to a GPS signal of one pulse per second; however, it is to be appreciated that the GPS signal may have a different duration. As shown in FIG. 5, packets 520 of the waveform may occupy a different number of slots depending on the size of the data segment of the packet. In one embodiment, packets can be configured into three different sizes: short packets 522 occupying a single time slot, medium packets 524 occupying two time slots, and long packets 526 occupying four time slots. It is to be appreciated, however, that packets 520 may be configured in more or fewer than three different sizes and the different sizes may be defined differently from the above example. Each packet 520 may have the same physical layer structure, an example of which is illustrated in FIG. 5, regardless of the number of slots the packet occupies. The size of the data segment 515 varies depending on the number of slots allocated to the packet, such that the medium and long packets 524, 526 carry more data, but the overall structure remains constant. Accordingly, those skilled in the art will recognize, given the benefit of this disclosure, that the more time slots 510 the packet 520 occupies, the more efficient the transmission may be because the ratio of the data segment 515 to other segments of the packet is increased.

Still referring to FIG. 5, there is illustrated an example of a physical layer packet structure of an embodiment of the waveform. The packet 520 is divided into various segments that perform different functions within the communications system. The packet 520 includes an initial group of segments 525 that are "filler" bits designed to accommodate any "wake-up" time in the receiver when the packet is received. The digital content of these filler segments may be unimportant. The group 525 includes a clock offset segment 530, a frequency tuning and antenna switch segment 535, a power amplifier ramp-up segment 540, and an Automatic Gain Controller (AGC) settling segment 545, each of which is discussed further below. The packet 520 further includes a time/frequency acquisition segment 550 which contains OFDM symbols used for waveform timing synchronization and frequency error estimation, as discussed further below. A frequency adjustment/filter flush segment 555 is another "filler" segment that provides time for the receiver filters to be flushed after applying frequency correction and automatic gain control. The packet 520 further includes a packet self discovery segment 560, and end group 565 of additional filler segments including a power amplifier ramp-down segment 570 and a propagation guard segment 575, each of which is discussed further below. The data (or payload) segment 515 contains the actual data/information desired to be conveyed from the transmitting node to the receiving node in the network and, as discussed above, has variable size depending on the number of slots used by the packet 520.

As discussed above, embodiments of the waveform may be used in transmitters and receivers that are implemented in nodes of a MANET. Accordingly, in one embodiment, the clock offset segment 530, which may also be referred to as a guard time segment 530, is used to account for timing uncertainty between nodes in the MANET. In some embodiments, the receiver uses an external GPS reference for timing information and to synchronize the slots 510. If the GPS connection is lost, an on-board receiver clock can be used for the timing information. However, the on-board clock may not be as accurate as the external GPS reference, and clocks on different nodes will tend to drift apart over time, causing timing uncertainty. For example, if two different nodes are not synchronized, one node may be transmitting before the other node expects to receive the signal. Therefore, the guard time segment 530 may be used to prevent any loss in data due to such clock drift by adding delay time to account for any early transmissions. In one example, the length of the guard time segment 530 may be sufficient to account for clock drift over a 24 hour period so as to permit continuous operation for 24 hours without GPS synchronization.

Figure 6:
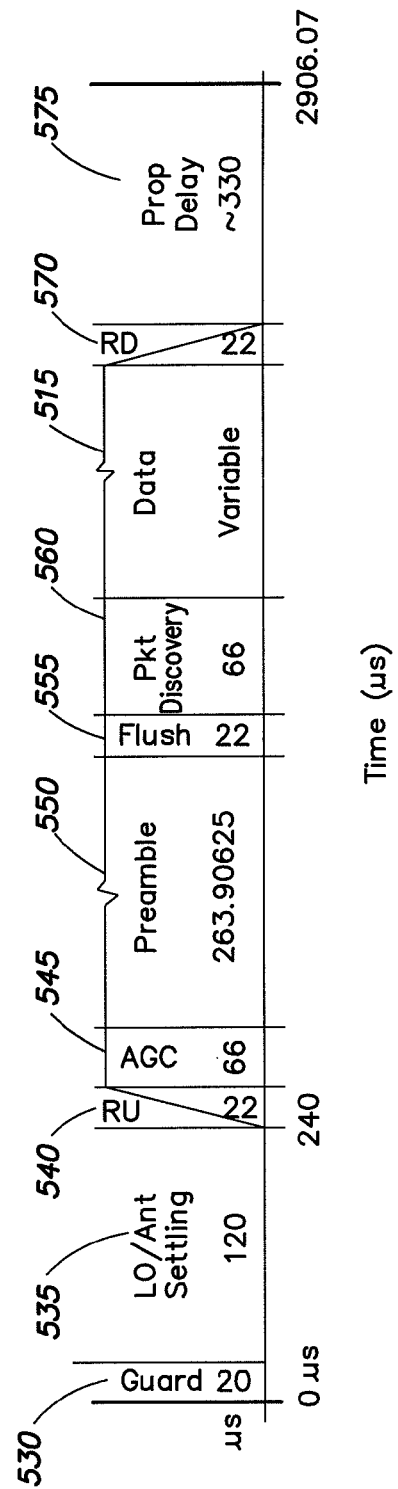
FIG. 6 is a timing diagram for one example of a single slot packet having the physical layer structure of FIG. 5 according to aspects of the invention.

FIG. 6 illustrates an example of a timing diagram for a single slot packet 520 and a slot length of 2910 μs. As shown in FIG. 6, in one example, the clock offset segment 530 may have a duration of approximately 20 μs. The propagation guard (or propagation delay) segment 575 may perform a similar function to the clock offset segment 530, namely adding delay time to prevent loss of data. In particular, the propagation guard segment 575 adds delay time to account for propagation delay between the transmitting and receiving nodes and thereby prevent loss of data. In one example, the propagation guard segment 575 may be about 330 μs in duration to account for a distance of up to 100 kilometers (km) between nodes.

The frequency tuning and antenna switch segment 535 allows time for the transceiver to be tuned and configured for the current time slot. This includes switching the antenna to the appropriate mode (e.g., from transmit to receive), tuning a local oscillator to the desired frequency band, as well as any other tuning and/or switching that may be necessary to configure the transceiver to receive the packet, and accounts for stabilization and settling of all tuning and switching transients. In one example, the frequency tuning and antenna switch segment 535 has a duration of approximately 120 μs. The power amplifier ramp-up and ramp-down segments 540, 570 account for delays in the turn-on and turn-off time of the power amplifier in the transmitter. The transmit bursts can be digitally controlled to contain the power spectral density and reduce transient off-channel emissions. In one example, each of the power amplifier ramp-up and ramp-down segments 540, 570 are approximately 22 μs in duration. The AGC settling segment 545 provides time for transmitter power stabilization and receiver automatic gain controller settling prior to signal synchronization and demodulation. In one example, the AGC settling segment 545 is about 66 μs in duration.

Still referring to FIGS. 5 and 6, the time/frequency acquisition segment 550 (also called the preamble) contains OFDM symbols used for waveform timing synchronization and frequency error estimation. The preamble segment 550 is constructed to have very good auto-correlation properties to allow for time and frequency synchronization. The synchronization, or signal acquisition process is used by the receiver to resolve time and frequency offsets on each packet prior to demodulation. As discussed above, in some embodiments the receiver may use a GPS signal for coarse timing synchronization within the TDMA network. However, this GPS-based timing may be insufficient to accurately demodulate the signal, as demodulation may require very precise time resolution, for example, on the order of 100 ns RMS. Accordingly, as discussed above, the transmitter inserts information into the waveform from which the receiver can accurately locate the signal in time and frequency. Furthermore, in a typical MANET, frequency offsets between the receiver and the received waveform arise due to, for example, oscillator error and/or Doppler shift as a result of the relative velocities between nodes. In one example, the oscillator error is estimated to be about 0.1 ppm, corresponding to about ±500 Hz total offset at 2.5 GHz. In another example, the Doppler shift due a 700 meters/second relative velocity results in ±5.83 KHz total offset at 2.5 GHz. Thus, the total frequency offset may be about ±6.33 KHz. Time offsets between the receiver and the transmitter arise due to propagation time of the signal. For example, if the transmitter and receiver are about 100 Km apart, the time offset due to propagation delay may be about ±334 μs. In addition, time offsets may arise between the receiver and transmitter due to operation after the loss of a GPS synchronization signal, for example up to about a ±20 μs offset. Thus, in one example, the total time uncertainty may be approximately ±354 μs. In one embodiment, the receiver first correlates to the preamble segment 550 and after successful time acquisition, then calculates the frequency error and adjusts the digital synthesizer to remove the frequency offset, as discussed further below.

Figure 7:
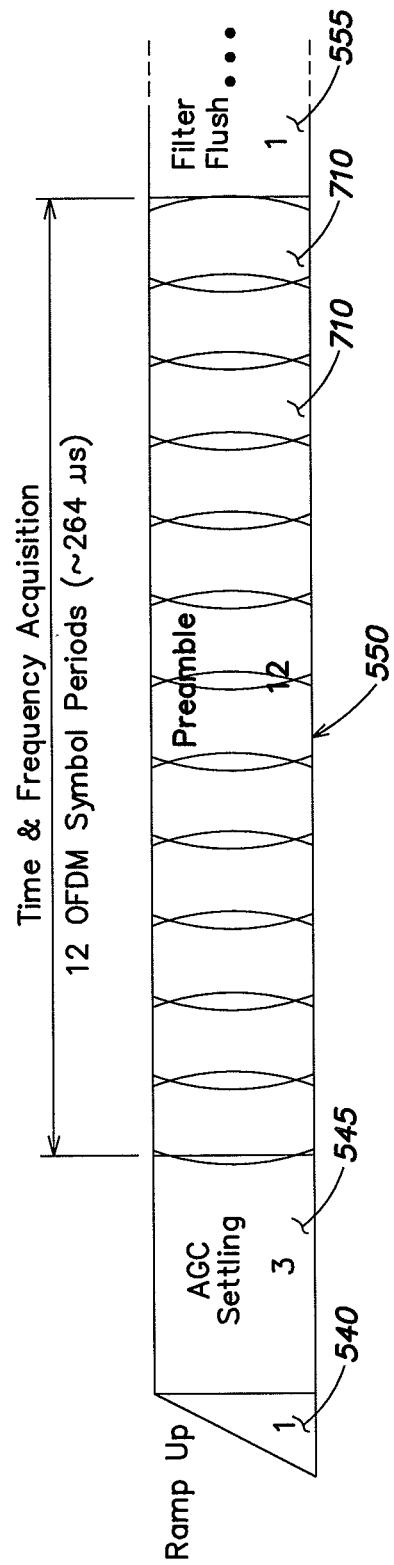
FIG. 7 is a timing diagram for one example of a preamble segment of the packet of the FIG. 6 according to aspects of the invention.

Referring to FIG. 7, there is illustrated one example of the packet preamble 550. In the illustrated example, the preamble 550 includes twelve non-repeating OFDM symbols 710 (which are windowed iFFT's, as discussed above). In one example, the use of twelve symbols 710 provides a sensitivity of about +1.7 dB; however it is to be appreciated that a different number of symbols may be used, for example, eight or ten symbols. The use of non-repeating symbols may provide added security and robust time synchronization; however, it is to be appreciated that the symbols may be repeated in some applications. In addition, in one example, the preamble is approximately 264 μs in length; however, it is to be appreciated that other lengths may be used. The twelve symbols 710 are used to acquire the time of arrival of the transmission at the receiver. The acquisition of the time of arrival may also be referred to as time synchronization. In one example, each symbol is individually correlated and then the correlations are summed to support successful time synchronization even where there may be a large frequency error. Time synchronization allows the receiver to compensate for such time offsets and to "reset" the waveform to defined starting point and obviate the need to maintain time synchronization between different transceivers in the network.

Figure 8:
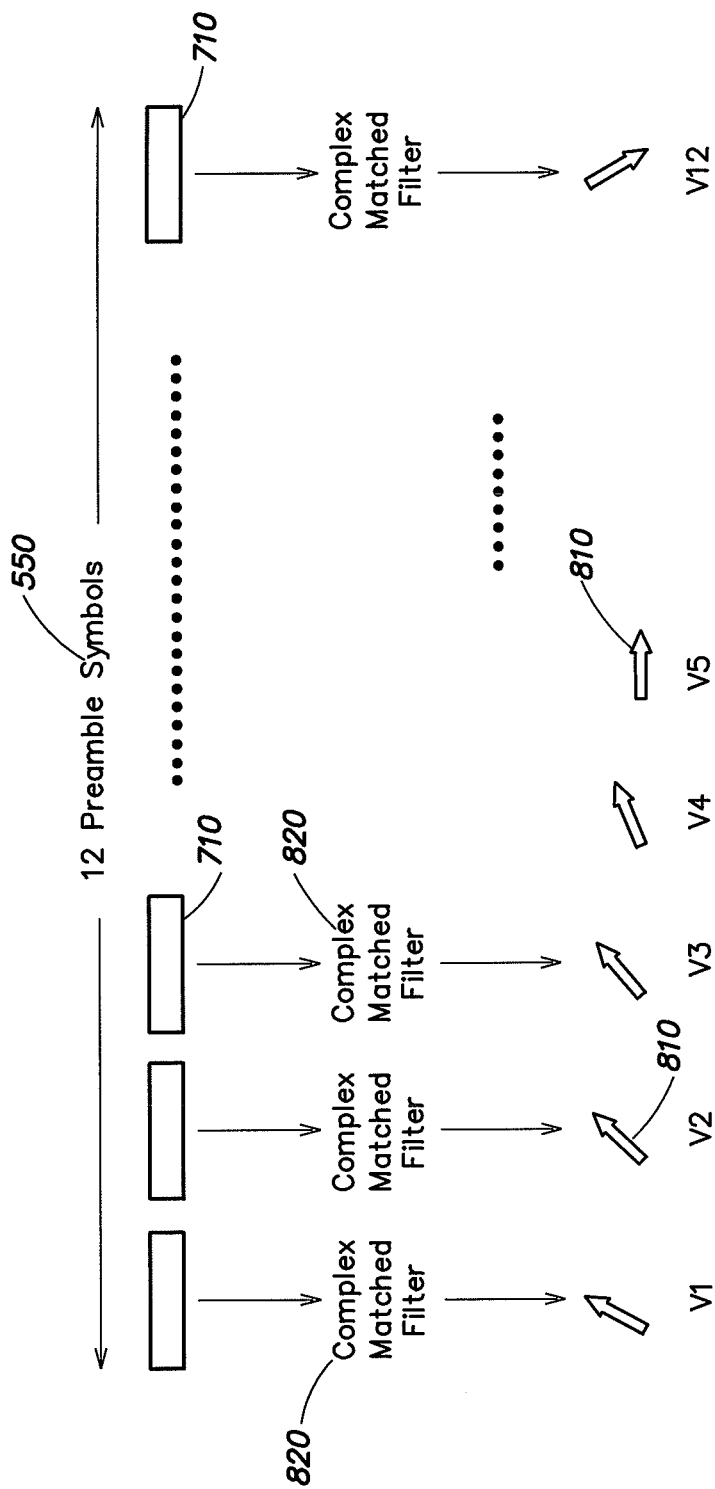
FIG. 8 is a diagram illustrating an example of a frequency acquisition process according to aspects of the invention.

In one embodiment, the twelve non-repeating OFDM symbols 710 of the preamble 550 are also used to determine frequency error. As discussed above, frequency acquisition (or synchronization) may be performed following the time acquisition/synchronization process. In one embodiment, a corrected frequency estimate is computed for each symbol in the preamble 550. These frequency estimates may be computed on average rotation vectors 810 from each symbol to the adjacent symbol, as illustrated in FIG. 8. In one example, complex matched filters 820 are used to compute the frequency error based on the average rotation vectors 810 from symbol to adjacent symbol.

Figure 9B:
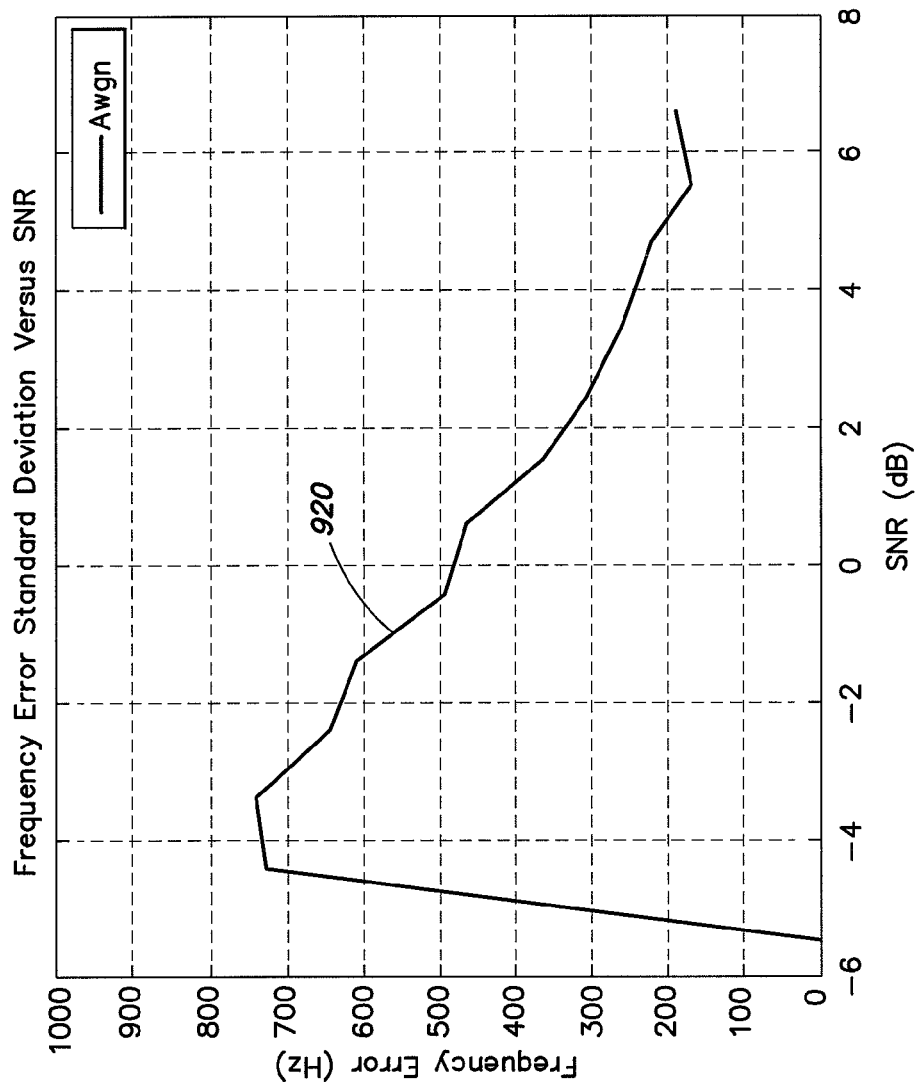
FIG. 9B is a graph of frequency error as a function of signal-to-noise ratio for an example of a waveform having the preamble structure of FIG. 7, according to aspects of the invention.

Simulations have demonstrated that the waveform allows for the time synchronization success rate (i.e., time synchronization successfully achieved) of 100%, or close to 100%, for positive signal-to-noise ratios (i.e., above 0 dB) in a channel with additive white Gaussian noise (AWGN). FIG. 9A illustrates a graph of time acquisition success rate (%) as a function of the signal-to-noise ratio 910 (in dB) for a simulated AWGN channel. FIG. 9B illustrates a graph of the frequency error 920 (in Hertz) as a function of signal-to-noise ratio (in dB) for the same simulated AWGN channel. As can be seen from FIG. 9B, the frequency error, using the frequency synchronization process discussed above, is only a few hundred Hertz give a positive signal-to-noise ratio. Additional simulations have shown that the time acquisition success rate in channels that have severe multipath effects, fading, interference, or other conditions not accounted for in an AWGN model channel, is still very good (e.g., generally over 90%) given a signal-to-noise ratio of at least 10 dB, and improves to close to 100% if the signal-to-noise ratio increases to 15 dB or above. Thus, a waveform with the preamble segment 550 discussed above allows robust, reliable communications between transceivers, even for links with less than ideal channel conditions.

Referring again to FIGS. 5 and 6, the filter flush segment 555 allows the receiver time to flush the filters after applying the frequency corrections discussed above and any automatic gain control hold. In one example, the filter flush segment 555 has a duration of approximately 22 μs and may contain one OFDM symbol, the content of which may be unimportant.

Figure 10:
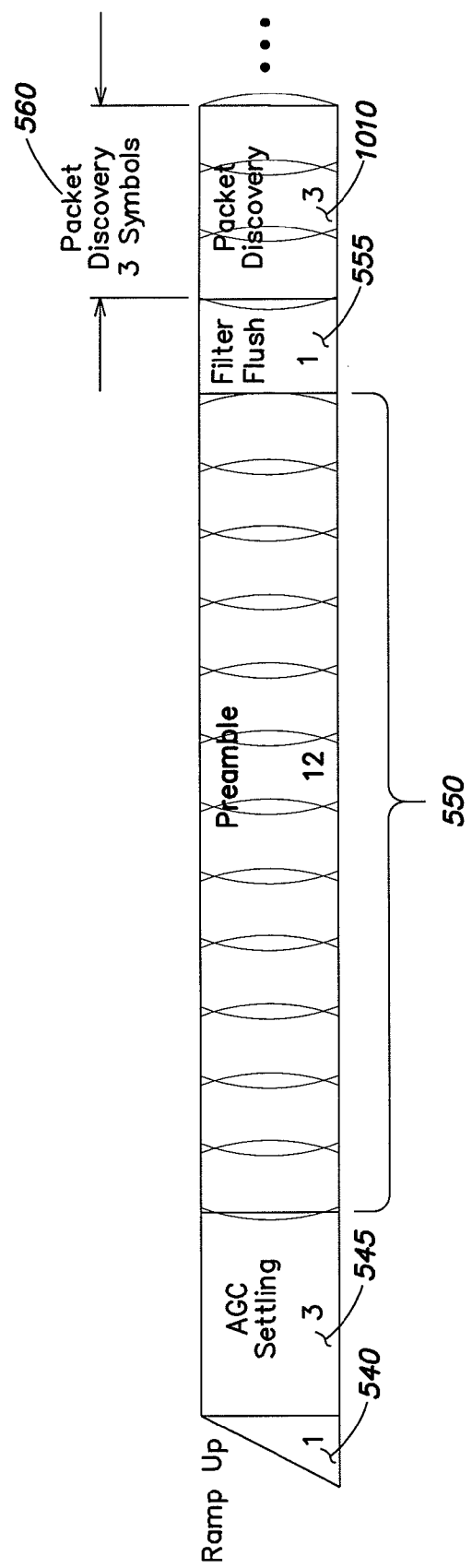
FIG. 10 is a timing diagram for one example of a packet self discovery segment of the packet of the FIG. 6 according to aspects of the invention.

The packet 520 further comprises the packet self discovery segment 560 which contains OFDM symbols containing information needed for the receiver to demodulate the packet. In one example, the packet self discovery segment 560 is about 66 μs in duration. Referring to FIG. 10, according to one embodiment, the packet self discovery segment 560 includes three non-repeating OFDM symbols 1010, which are windowed iFFTs as discussed above, which may provide twelve bits of information to the receiver. As discussed above, these twelve bits describe characteristics of the packet and in particular the payload (data segment 515) required for the receiver to demodulate the packet. This information includes, for example, the packet size (e.g., one, two or four slots), the modulation type used by the transmitter (e.g., BPSK, QPSK, QAM, etc.), the number of channel segments, and the code rate for any forward error correction encoding that was implemented by the transmitter. In one embodiment, the information contained within the twelve bits of the packet self discovery segment 560 is unknown by the receiver until the packet self discovery segment is received and decoded, which allows the receiver to be adaptable to varying packet types and sizes since the demodulation information can be retrieved and implemented dynamically for each packet. Each symbol 1010 in the packet self discovery segment 560 may provide four bits of information encoded as one of sixteen Walsh sequences modulated onto the twenty-one tone channel segment discussed above. For each symbol, the receiver selects the Walsh sequence with the maximum likelihood of success and decodes the four bits to obtain the demodulation information.

Figure 11:
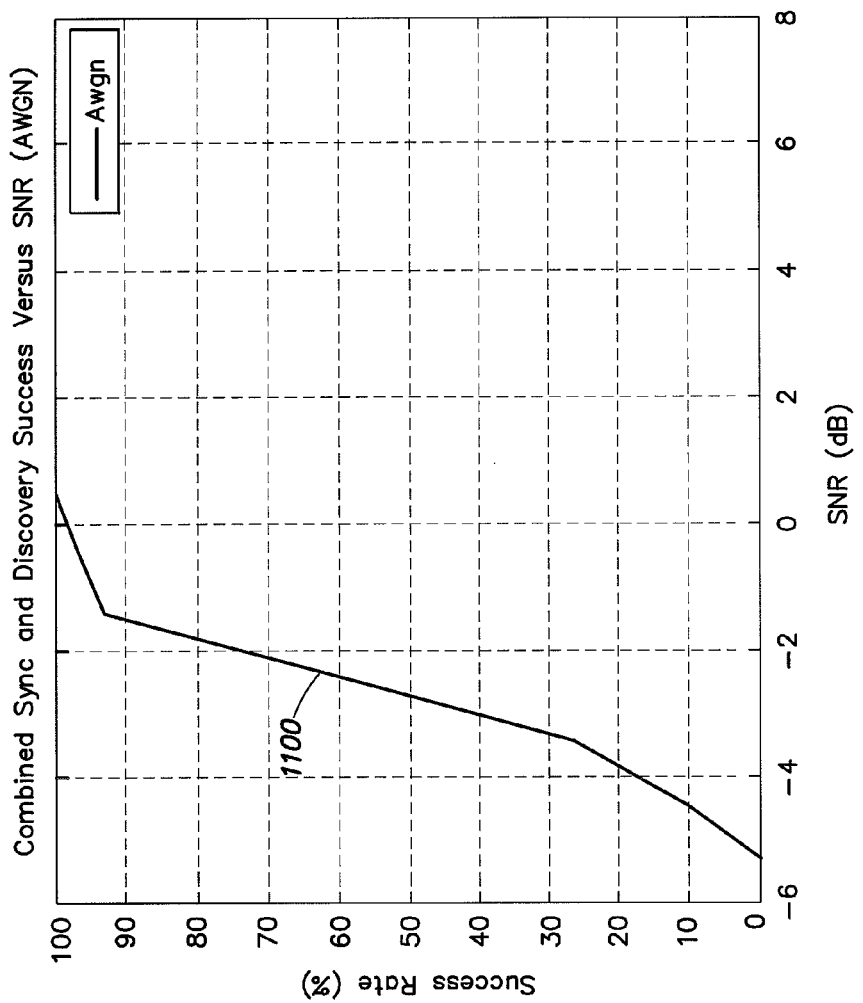
FIG. 11 is a graph of packet discovery success rate as a function of signal-to-noise ratio for an example of a waveform having the packet self discovery segment of FIG. 10, according to aspects of the invention.

Simulations have demonstrated that the waveform allows for a self discovery success rate (i.e., the packet is successfully demodulated) of 100%, or close to 100%, for positive signal-to-noise ratios (i.e., above 0 dB) in a channel with additive white Gaussian noise (AWGN). FIG. 11 illustrates a graph of the success rate 1110 (%) for combined time and frequency synchronization and self discovery as a function of the signal-to-noise ratio (in dB) for a simulated AWGN channel. Additional simulations have shown that the self discovery success rate in channels that have severe multipath effects, fading, interference, or other conditions not accounted for in an AWGN model channel, is still very good (e.g., generally over 90%) given a signal-to-noise ratio of at least 10 dB, and improves to close to 100% if the signal-to-noise ratio increases to 15 dB or above. Thus, a waveform with the packet self discovery segment 560 discussed above allows robust, reliable communications between transceivers, even for links with less than ideal channel conditions.

According to one embodiment, the physical layer waveform provides three link quality metrics which may be reported to higher levels of networking software in the node transceivers which may make changes to various system parameters based on these metrics. The first metric is a Receive Signal Strength Indication (RSSI) which indicates received signal strength relative to the receiver antenna. The second metric is a per bit to noise power spectral density ratio metric (Eb/No metric) which provides an indication of the per bit to noise power spectral density ratio based on demodulator soft-decision values. This metric reflects all distortion effects and provides a relative indication of the quality of demodulated data. The third metric is a signal-to-noise ratio (SNR) metric which estimates the true signal-to-noise ratio relative to channel noise and/or interference. The SNR metric is computed based on average tone power and channel noise/interference as measured at the end of each slot. The SNR metric measurements are made in the frequency domain for each received channel segment. Unlike the Eb/No metric, the SNR metric does not reflect SNR limitations due to power amplifier distortion. Accordingly, the SNR metric and Eb/No metric can be used together to provide estimates of the channel and link conditions.

Figure 12:
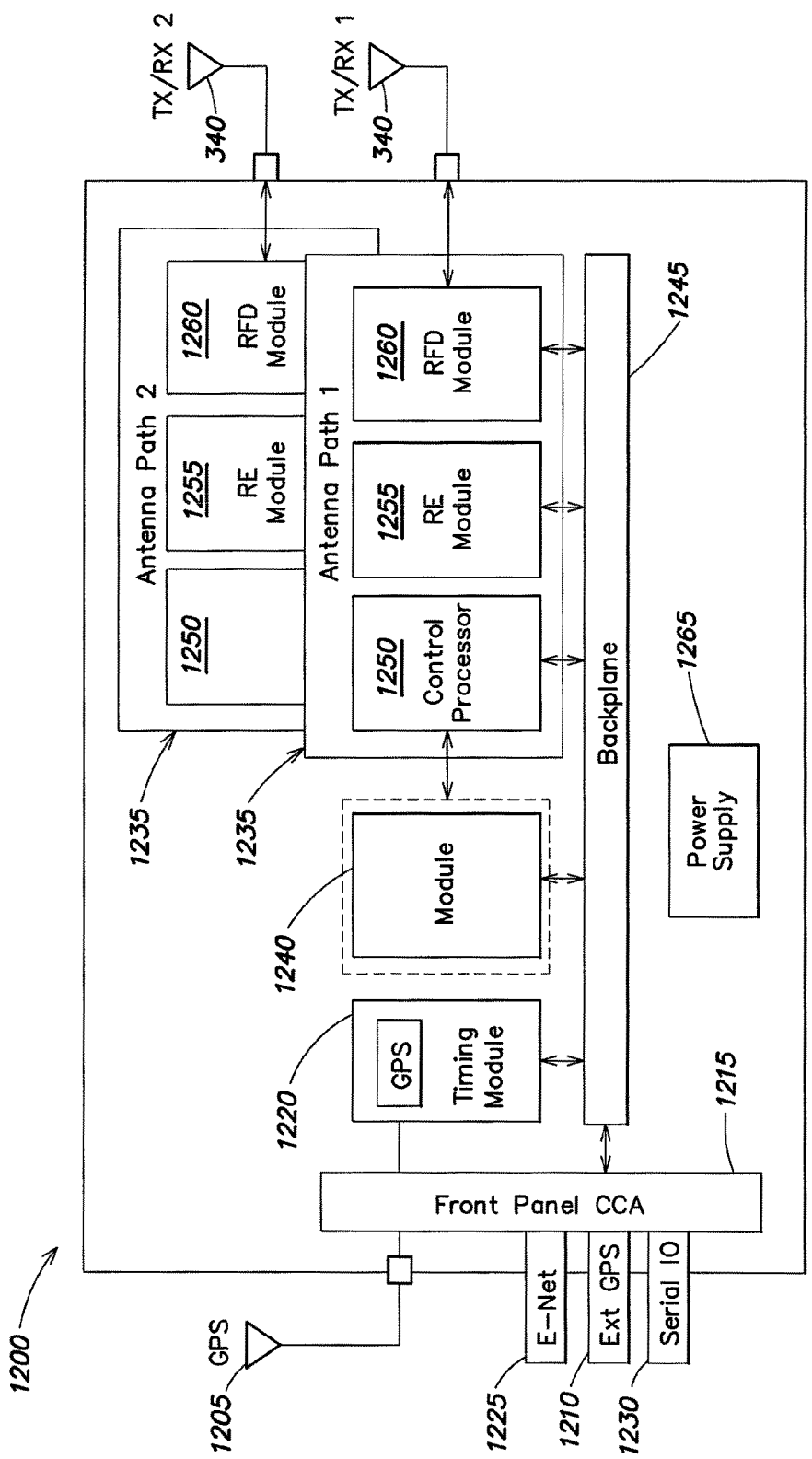
FIG. 12 is a block diagram of one example of a radio transceiver configured to employ the physical layer waveform structure according to aspects of the present invention.

Referring to FIG. 12, there is illustrated a block diagram of one example of a radio transceiver in which embodiments of the waveform discussed above may be implemented. In one embodiment, the radio transceiver 1200 is capable of multiple input multiple output (MIMO) operation and exploits time and space diversity through duplicative antennas and duplicative antenna paths to provide robust connectivity in severe fading environments, as discussed further below. FIG. 12 illustrates an example configuration for a 2T×2R (i.e., two transmitters and two receivers) MIMO system; however it is to be appreciated that any of the transceivers in the network may include one or more transmitters and one or more receivers, not limited to the 2×2 example shown in FIG. 12. In addition, the radio transceiver 1200 may be dynamically configurable between any of the above-mentioned configurations, for example, MIMO operation may be disabled (or enabled) via a user interface. The preamble 560 of the packet 520 may include a bit indicating MIMO operation if applicable.

As discussed above, according to one embodiment the radio transceiver uses a GPS signal for timing and synchronization. Accordingly, the radio transceiver 1200 may include a GPS antenna 1205 to receive an external GPS signal, for example from a GPS satellite. Alternatively, the transceiver 1200 may include a GPS input 1210 configured to accept a GPS timing signal from an external source as an alternative to receiving the GPS signal via the GPS antenna 1205. The GPS signal may be provided, via a Front Panel Circuit Card Assembly (CCA) 1215 to a timing module 1220 where it is processed to provide timing information to synchronize the waveform to the channel slots, as discussed above. The timing module 1220 may also include a clock (not shown) that can continue to provide timing information to synchronize the waveform in the event of a GPS outage, as discussed above. In one example, the clock is sufficiently accurate, and the waveform includes a sufficient large clock offset segment 530 such that the transceiver can operate normally for up to 24 hours without access to the external GPS signal.

The radio transceiver 1200 may further include an Ethernet port 1225 and a serial I/O port 1230 coupled to the Front Panel CCA 1215. These ports may acts as interfaces through which data is communicated to the radio transceiver 1200 for transmission via antennas 340. The Front Panel CCA 1215 provides connectors and electronic components to accommodate the variety of electrical interfaces discussed above, and also may provide additional interfaces if needed.

Still referring to FIG. 12, in one embodiment, the radio transceiver 1200 includes a processing module 1240 that provides general computational services to support the interfaces of the radio transceiver 1200, and may also implement networking protocols for the network in which the radio transceiver is operating. For example, in one embodiment, the processing module 1240 implements a standard Internet Protocol (IP) network stack accessible through the Ethernet port 1225. In one example, the processing module 1240 is a general purpose computer. The timing module 1220 and processing module 1240 are coupled to the antenna path(s) 1235 via a signal backplane 1245. As discussed above, the example transceiver illustrated in FIG. 12 is 2×2 MIMO configuration and accordingly includes two first antenna paths 1235 each coupled to one of the antennas 340. Each antenna path 1235 includes a control processor module 1250, a Receiver/Exciter (RE) module 1255, and a Radio Frequency Distribution (RFD) module 1260, each of which is discussed further below. The radio transceiver 1200 further includes a power supply 1265 to provide operating power to the components of the transceiver. In one example, the power supply 1265 converts a 24 volt prime power to other voltages required by the various components of the transceiver 1200.

Figure 3B:
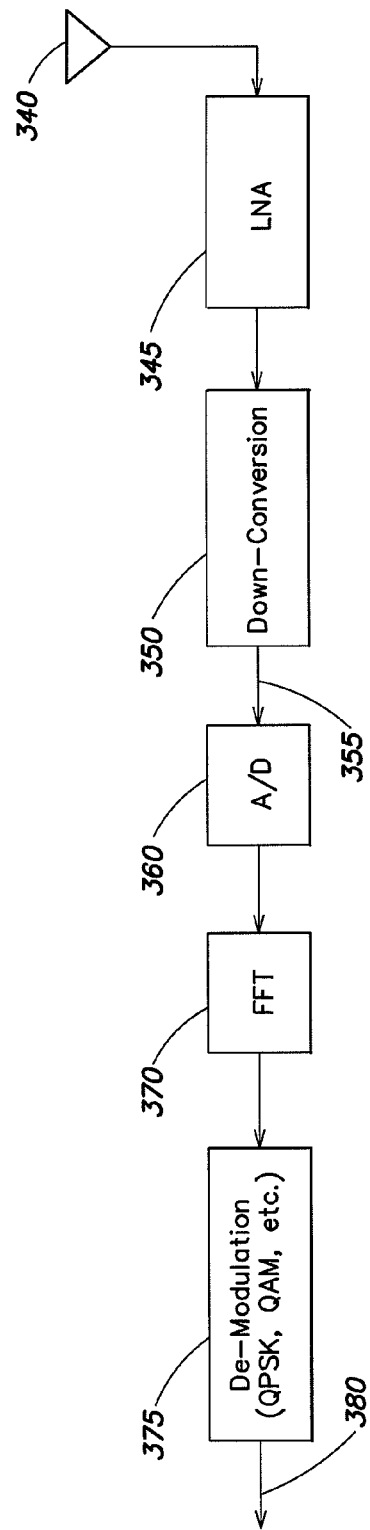
FIG. 3B is a block diagram of a receiver configured to receive and decode an OFDM waveform according to aspects of the present invention.

According to one embodiment, the control processor module 1250 provides computing capability, additional to that provided by the processing module 1240, to directly support the physical layer of the waveform and to implement the computations required to transmit or receive the waveform. The control processor module 1250 may therefore include a digital signal processor (1310, FIGS. 13A and 13B) that receives and processes digital signals which are intended to be transmitted or which are received. For example, the control processor module 1250 may also perform the iFFT and FFT computations and cyclic extension discussed above to generate and decode the OFDM symbols in the waveform. Accordingly, in a transmitter path, the control processor module may incorporate the iFFT module 315 discussed above with reference to FIG. 3A, and in a receiver path, the control processor module 1250 may incorporate the FFT module 370 discussed above with reference to FIG. 3B. The control processor module may also implement forward error correction encoding and decoding of the waveform, and interleaving and de-interleaving of the bits of a packet, as well as transmission security features, as discussed further below. The control processor module 1250 may also implement modulation and demodulation of the data in the waveform. In addition, the control processor module 1250 may monitor the status of the radio transceiver 1200 and provide control of the RE module 1255. In one embodiment, the RE module 1255 provides analog signal processing (e.g., amplification, frequency translation, and filtering). Accordingly, in the transmitter path, the RE module 1255 may incorporate the up-conversion module 330 and the digital to analog converter 320 and in the receiver path, the down-conversion module 350 and analog to digital converter 360. The RFD module 1260 provides power amplification of RF signals for transmitting, Low Noise Amplification (LNA) for receiving, and switches the antenna between different electronic paths based on whether the radio is receiving or transmitting. Accordingly, in the transmitter path, the RFD module 1260 may incorporate the RF amplifier 335 and in the receiver path, the low noise amplifier 345. According to one embodiment, the antenna path(s) 1245 are implemented as one or more field programmable gate arrays (FPGAs), although those skilled in the art will recognize that other implementations can be used.

Figure 13A:
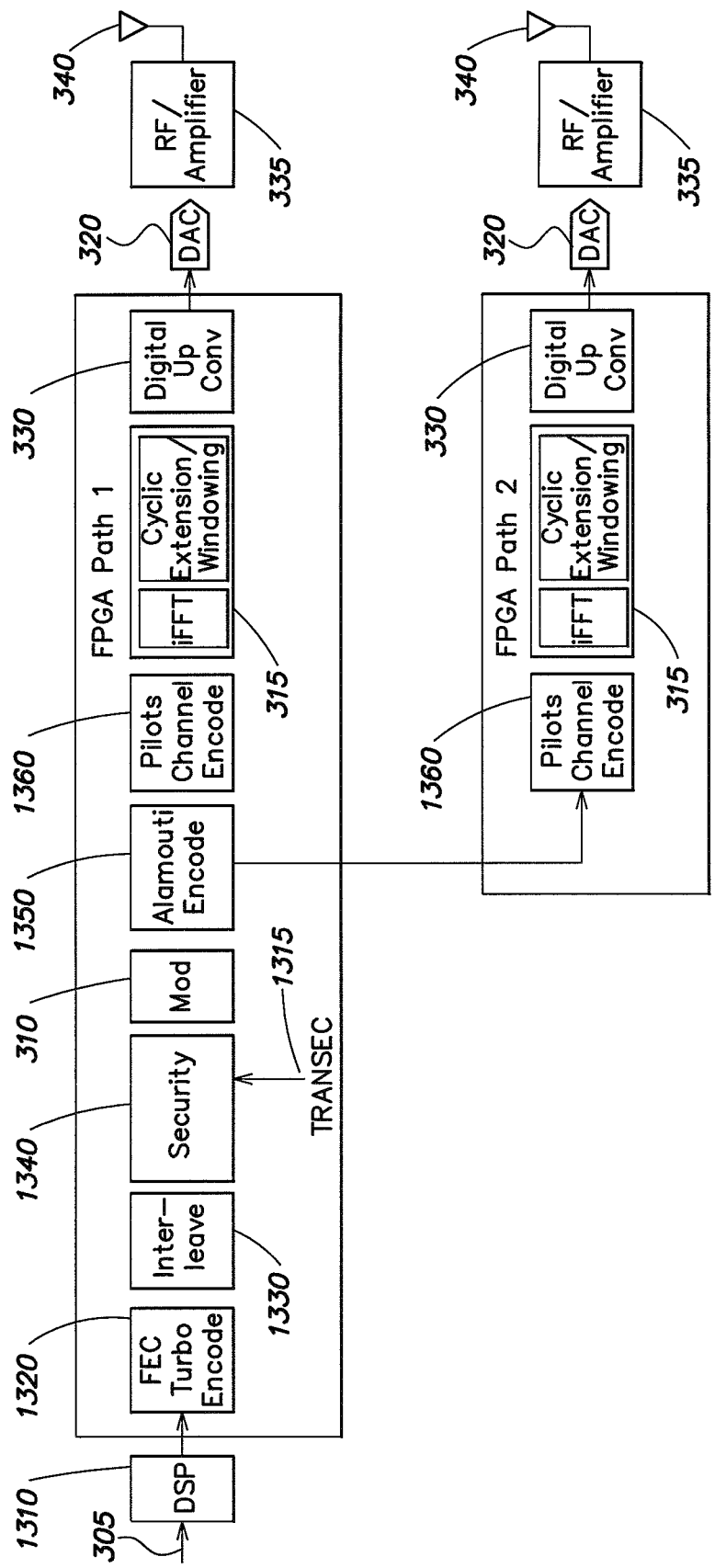
FIG. 13A is a block diagram of one example of a transmitter path of the radio transceiver of FIG. 12, according to aspects of the invention.
Figure 13B:
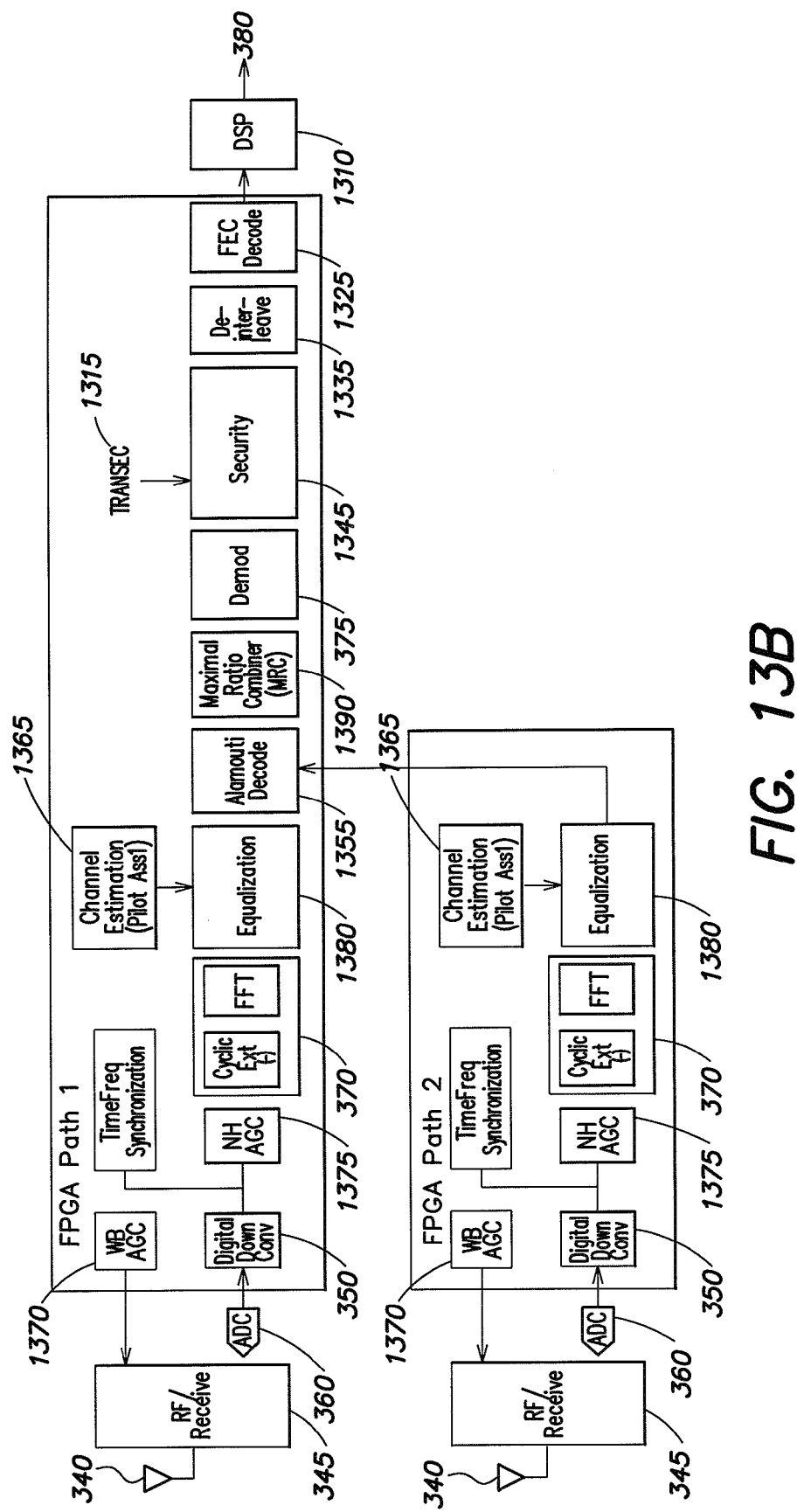
FIG. 13B is a block diagram of one example of a receiver path of the radio transceiver of FIG. 12, according to aspects of the invention.

Referring to FIG. 13A, there is illustrated a block diagram of one example of a transmitter path for the radio transceiver 1200. FIG. 13B illustrates a corresponding block diagram of one example of a receiver path for the radio transmitter 1200. According to one embodiment, the transceiver employs forward error correction (FEC) coding to at least some of the segments of the packet 520 (see FIG. 5) to increase the increase the reliability of the transmission. Accordingly, the transmitter path may include an FEC encoder 1320 and the receiver path may include a complementary FEC decoder 1325. In one example, the FEC encoder 1320 is a turbo encoder and uses a turbo code standard such as the Commercial WiMax (802.16e) Turbo Code Standard. Therefore, in one example, FEC turbo encoder 1320 may be implemented using an FPGA such as the VIRTEX 5 commercial FPGA produced by the Xilinx Corporation. According to one embodiment, the FEC encoder 1320 may be configurable to support varying code rates between ⅓ and 1. The coding strategy may be optimized for each packet configuration based on, for example, packet size, packet modulation and packet bandwidth, to yield maximum throughput and energy per bit to noise power spectral density ratio (Eb/No). In one example, FEC coding is done on a frame by frame basis for each packet.

For optimum error correction performance it is desirable to distribute the encoded bits from any single frame of the packet such that they uniformly span the frequency and time occupied by the packet at the physical layer. The physical phenomena of burst noise, fading, and narrowband interference tend to introduce errors that correlate errors in one or more of these dimensions. By distributing bits over the packet, a larger number of frames experience errors, but the number of errors in any single frame can be significantly reduced. The WiMax (802.16e) Turbo Code Standard has a fairly abrupt threshold error rate above which it cannot effectively correct errors. By spreading the errors over many frames it is much less likely that this threshold will be exceeded on any single frame. Accordingly, the transmitter path may include an interleaver 1330, which in one example is a modulo interleaver that distributes the bits across the packet, and the receiver path includes a corresponding modulo deinterleaver 1335 to reorder the bits at the receiver prior to decoding.

Figure 14:
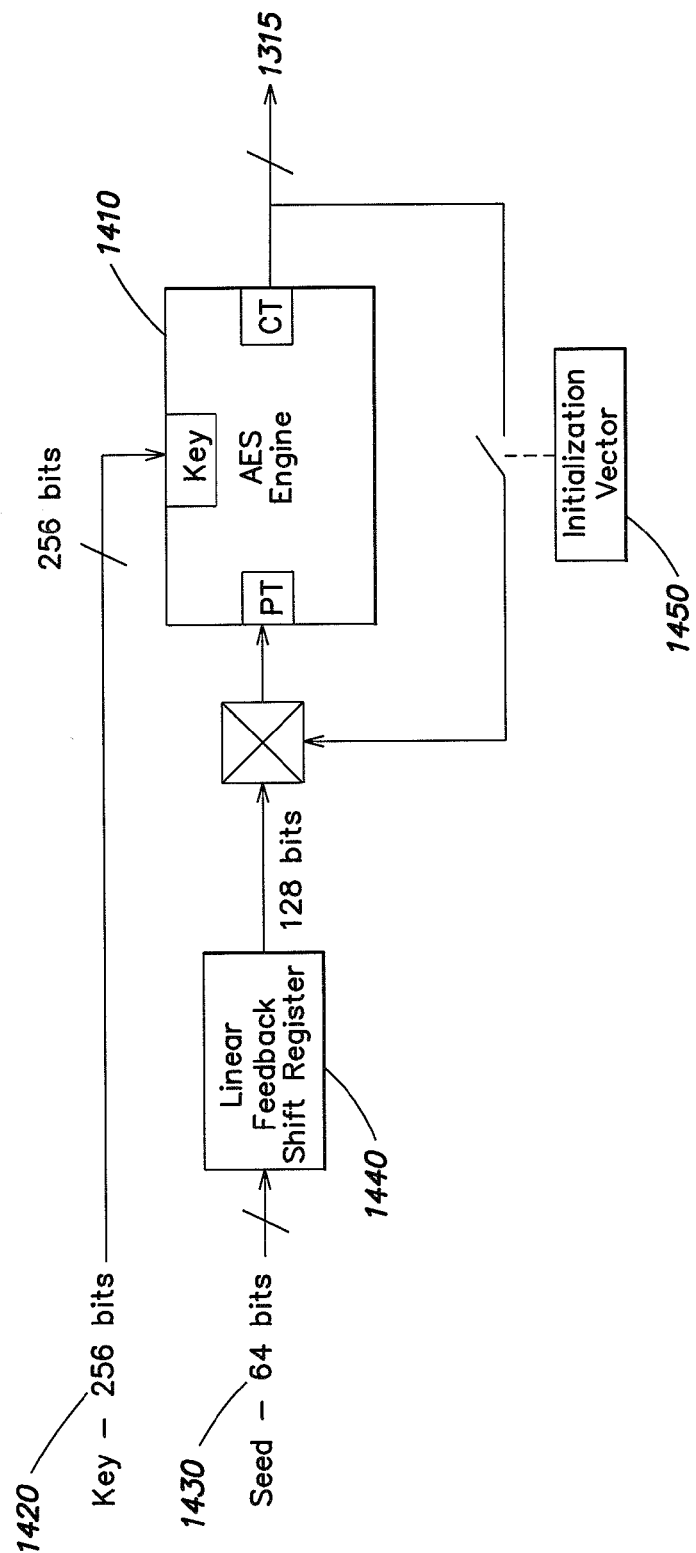
FIG. 14 is a block diagram of one example of a transmission security encoder that may be implemented in the radio transceiver of FIG. 12, according to aspects of the invention.

As discussed above, in one embodiment, the waveform incorporates transmission security features. Accordingly, the transmitter path may include a transmission security encoder 1340 that uses pseudorandom sequences 1315 to add transmission security to the packets. In one example, each of the 21 OFDM tones in every assigned channel segment are encoded with a transmission security feature, referred to as security covering, prior to the iFFT mapping from the frequency domain to time domain discussed above. In one example, security covering includes the mapping of each symbol to a new symbol based on a complex security bit generated as part of a pseudorandom sequence 1315. In one embodiment, all of the packet segments including the "filler" segments discussed above are security covered. According to one embodiment, the security encoder 1340 includes an Advanced Encryption Standard (AES)-256 based, National Institute of Standards and Technology (NIST) approved, security generator 1410, illustrated in FIG. 14. The AES generator 1410 that uses a 256 bit key 1420 along with a 64 bit seed sequence 1430 to generate the pseudorandom sequence 1315 of the security cover bits. The seed sequence may be generated based on a combination of time information, e.g., time of day, calendar date, etc., and various network identification parameters. In one example, a linear feedback shift register 1440 is used to generate the seeds 1430. An initialization vector 1450 may be used to activate the transmission security encoder 1340 to encode some or all of the packet segments, as discussed above. The receiver path includes a complementary security decoder 1345.

The transmitter path further includes a modulator 310 which modulates the security covered bits according to a selected data modulation scheme such as, for example, BPSK, QAM or QPSK, as discussed above. The receiver path includes a complementary demodulator 375. The receiver may also include modules 1370 and 1375 which implement wideband and narrowband automatic gain control, respectively.

As discussed above, the transceiver can be configured for MIMO operation in which the transceiver exploits time and space diversity through duplicative antennas 340 and duplicative antenna paths 1235 to provide robust connectivity in severe fading environments. According to one embodiment the transceiver employs space-time block coding to provide transmitter path diversity and to prevent interference between antennas 340. Space-time block coding which is a technique whereby multiple copies of a data stream are transmitted across a number of antennas and the various received versions of the data are combined to improve the reliability of data-transfer. In severe fading environments where the transmitted signal may be subject to scattering, reflection, refraction, etc., and may then be further corrupted by thermal noise in the receiver, some of the received copies of the data will be "better" than others. Therefore, the built-in redundancy of transmitting and/or receiving multiple copies of the data results in a higher chance of being able to use one or more of the received copies to correctly decode the received signal. In one example, the transceiver implements Alamouti space-time coding and decoding when multiple transmitters are active, and therefore the transmitter path includes an Alamouti encoder 1350 and the receiver path includes an Alamouti decoder 1355. The Alamouti encoder 1340 interleaves transmission data across space and time to provide added diversity.

Figure 15:
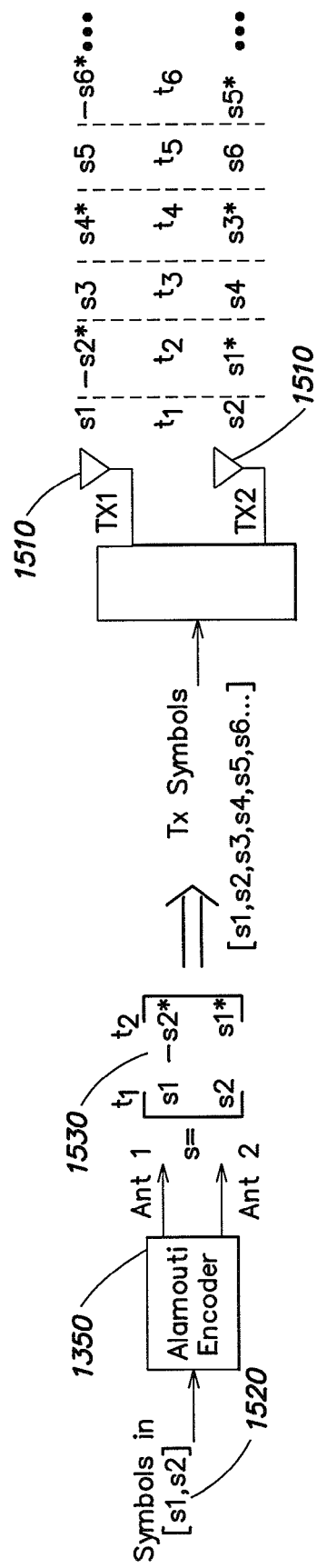
FIG. 15 is a diagram illustrating one example of an Alamouti space-time block coding method implemented by the transmitter according to aspects of the invention.

FIG. 15 illustrates a 2×1 Multiple Input Single Output (MISO) Alamouti coding process 1500 using two transmitters 1510 and a single receiver (not shown) according to one embodiment. The Alamouti encoder 1350 receives the transmission symbols 1520 and produces a space-time code word 1530 that comprises the interleaved transmission symbols. The code word 1530 is then transmitted by each transmitter 1510. Alamouti encoding may be applied to all or some of the segments in the packet 520. For example, in one embodiment, only the packet payload segment 515 is space time coded while the preamble 560 is transmitted and received over a single antenna 340. In another example, both the packet payload 515 and the preamble are space time coded. The receiver uses the Alamouti space-time decoder 1355 to recombine symbols previously interleaved over space and time by the Alamouti encoder 1350.

According to one embodiment, the receiver uses information obtained from a channel estimation process to decode the Alamouti symbols. The transmitter path may include a pilot channel encoding module 1360 which inserts pilot symbols containing known information into the data stream, as discussed further below. The receiver path may include a channel estimation module 1365 in each receiver path. The channel estimation module 1365 and normalization module 1380 use the channel probe information (also referred to as pilot tones) embedded in the waveform to remove phase shift and amplitude scaling and normalize the received waveform, thereby accounting for channel variations in the different wireless channels/links. In one example, the pilot tones are inserted into the data segment 515 (see FIG. 5) of the packet 520. As discussed above with reference to FIG. 2A, in one example, each 1.2 MHz section of the waveform contains 21 tones modulated with QPSK or BPSK single carrier modulation. According to one example, both QPSK and BPSK modes are coherently demodulated using pilot symbol assisted modulation (PSAM) for robust demodulation in high dynamic scenarios and multipath environments. Referring to FIG. 13A, the transmitter includes a pilot channel encode module 1360 that inserts the pilot tones into the data segment 515 of the waveform. For systems with multiple transmitter paths (e.g., configured for MIMO operation), pilot tone channel encoding is done individually for each channel; accordingly, as shown in FIG. 13A.

Figure 16:
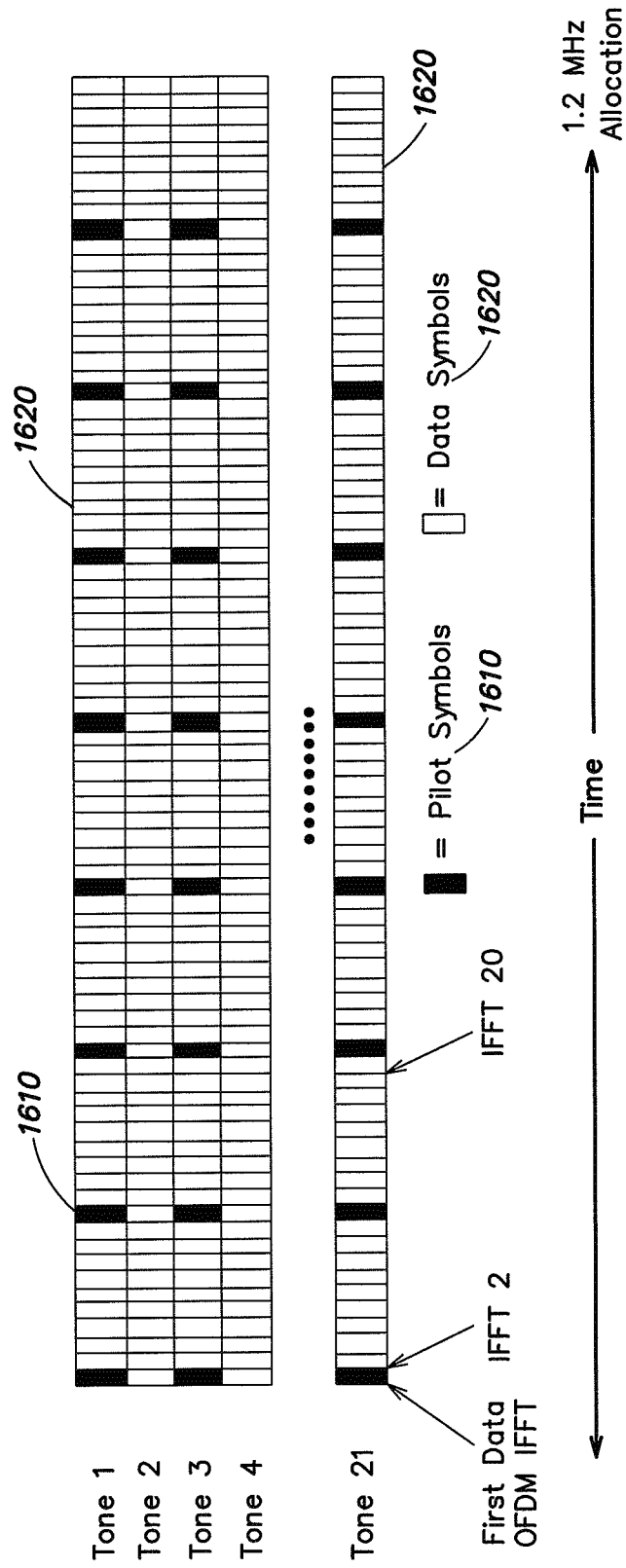
FIG. 16 is an illustration of an example of a waveform section showing pilot symbols interspersed with the data symbols according to aspects of the invention.

Referring to FIG. 16, there is illustrated an example of a waveform section showing pilot symbols 1610 interspersed with the data symbols 1620. As discussed above, each symbol is created using an inverse fast Fourier transform (iFFT), and in one example, every 10th data symbol is a pilot symbol 1610, starting with the first data packet. The pilot symbols 1610 can be demodulated and, because they contain known information, may be used to reconstruct channel conditions (such as delay, attenuation, etc.); thus providing the channel estimation. MIMO operation requires estimation of M×N channels as each of N receivers forms an estimate of the channel from each of M transmitters. In one example, in single transmitter operation one antenna 340 transmits on all pilot symbol tones. To support MIMO operation, additional pilot tones may be interlaced within the pilot symbol. In one example, frequency-orthogonal pilot tones are added to the existing pilot symbol.

Figure 17:
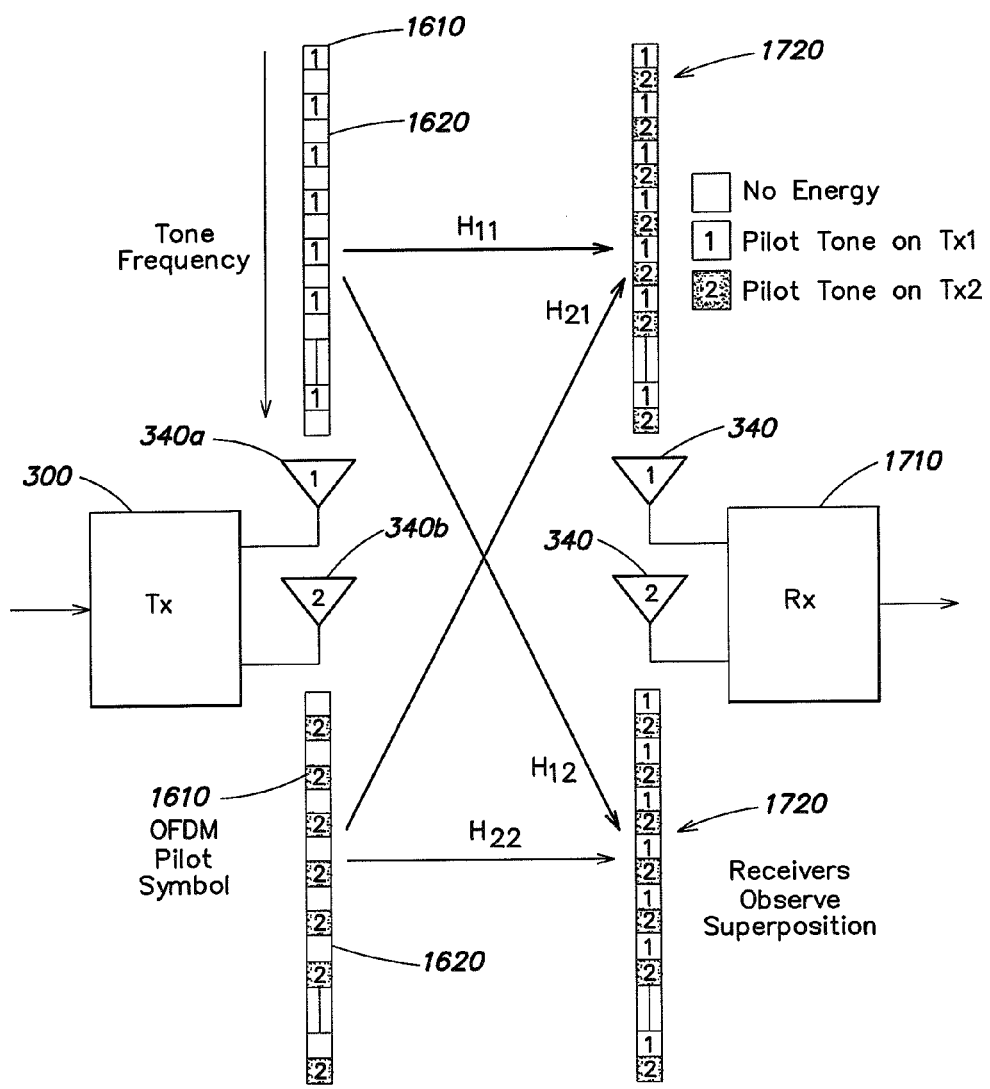
FIG. 17 is an illustration of the use of frequency orthogonality between the even and odd pilot tones to allow a receiver to discriminate between emissions from each transmitter, according to aspects of the invention.

According to one embodiment, in dual transmitter operation, each antenna 340 transmits on half of the pilot symbol tones. For example, referring to FIG. 17, antenna 340a may transmit on the odd tones and antenna 340b may transmit on the even tones. Thus, for antenna 340a, pilot symbols 1610 are inserted only in odd tones and the even tones contain data symbols 1620. Even tone pilots symbols may be interpolated from the neighboring odd tone pilots. For antenna 340b, pilot symbols 1610 are inserted only in even tones and the odd tones contain data symbols 1620. Frequency orthogonality between the even and odd pilot tones allows the receiver to discriminate between emissions from each transmitter, as illustrated in FIG. 17. The receiver 1710 observes a signal stream 1720 at each receive antenna 340 that comprises a superposition of the pilot tones from both transmit antennas 340a, 340b. The channel estimator 1365 may measure the complex scaling of the pilot tones transmitted every ten (or other multiple) symbols. Linear filtering may be used to smooth these channel estimates to form estimates for every tone frequency. Linear interpolation may then be used to form estimates at every symbol time. This approach is extendible to support additional transmitters and receivers (e.g., 4×4 MIMO). In one embodiment, the channel estimation process includes estimating noise variance which is then used in a maximal ratio combiner 1390. Thus, the SNR may be estimated or determined on individual tones and symbols, allowing for robust system performance even where channel conditions may vary over the transmission of the complete waveform (e.g., varying conditions from symbol to symbol or group of symbols to group of symbols) or may vary over frequency.

Embodiments of the waveform and transceiver system discussed herein may provide reliable communication between nodes in a MANET or other informal network despite large distances between nodes and high relative velocities between nodes. Embodiments of the system also provide high-link availability, transmission security, segment to segment adapt-ability and compatibility with certain spectral planning requirements through the use of 1.2 MHz segments.

As discussed above, packets of the waveform have a synchronization header that supports robust time and frequency synchronization in the receiver despite time and frequency ambiguities resulting from the distance between nodes and the large relative node velocities. Packet headers include descriptive information regarding the particular encoding of the packet payload, such that the transmitter can unilaterally modify the data rate of each packet in support of adaptive data rate functionality. The packet payload comprises Orthogonal Frequency Division Multiplex (OFDM) symbols with periodic channel probes. In one embodiment, the system employs space time coding to provide transmit path diversity in an attempt to mitigate multipath fading between nodes. Orthogonal channel probes from each transmitter allow the receiver to develop a model of the propagation channel from each transmit antenna to the receive antenna for the purpose of correcting adverse effects of the propagation channel on the received signal. These adverse effects include but are not limited to phase rotation, amplitude scaling, and frequency selective filtering. To provide transmission security, each symbol may be covered with a pseudorandom sequence, as discussed above.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A transceiver configured to transmit and receive a packet-based waveform over at least one communication channel, the transceiver comprising:
    an input configured to receive data to be transmitted;
    an antenna configured to transmit a transmit signal comprising the waveform and to receive a received signal comprising the waveform, the waveform operating over a plurality of bandwidth channel segments and each packet of the waveform comprising a preamble segment, a packet self discovery segment and a payload segment;
    a modulator coupled to the input and configured to modulate the data to provide modulated data;
    a control processor module configured to generate each packet of the waveform from the modulated data as a sequence of orthogonal frequency division multiplexed (OFDM) symbols, each symbol of the waveform modulated onto one the plurality of bandwidth channel segments, and the control processor including a Fourier transform module configured to generate each symbol by computing an inverse fast Fourier transform of the modulated data;
    a demodulator configured to demodulate the received signal based at least in part on a number of bandwidth channel segments within the plurality of bandwidth channel segments, the number defined in the packet self discovery segment;
    a pilot channel encoder configured to embed periodic pilot symbols within the payload segment of each packet of the waveform; and
    a synchronization module configured to acquire a time of arrival of the received signal by individually correlating each symbol of the preamble segment of the waveform to provide a series of correlations and summing the series of correlations.

2. The transceiver as claimed in claim 1, wherein the waveform has a time division multiple access physical layer structure, and further comprising:
    a global positioning system (GPS) input configured to receive an external GPS signal; and
    a timing module configured to receive the GPS signal and to synchronize the waveform to time slots within the communication channel based on the GPS signal.

3. The transceiver as claimed in claim 1, wherein the packet self discovery segment further includes information descriptive of the data and the waveform; and
    wherein the demodulator is further configured to extract the information and perform demodulation of the data based on the information.

4. The transceiver as claimed in claim 3, wherein the information includes at least one of a modulation type, a packet size, and a forward error correction code rate.

5. The transceiver as claimed in claim 3, wherein the packet self discovery segment comprises three non-repeating OFDM symbols.

6. The transceiver as claimed in claim 1, wherein the control processor module is further configured to implement windowed cyclic extension on each symbol.

7. The transceiver as claimed in claim 1, wherein the synchronization module is further configured to compute a corrected frequency estimate for each symbol in the preamble segment of the waveform of the received signal;
    wherein the synchronization module comprises a plurality of complex filters configured to compute a frequency error for each symbol in the preamble segment of the waveform of the received signal based on an average rotation vector from symbol to adjacent symbol; and
    wherein the synchronization module is configured to compute the corrected frequency estimate based on the frequency error.

8. The transceiver as claimed in claim 7, wherein the preamble segment of the waveform comprises twelve non-repeating OFDM symbols.

9. The transceiver as claimed in claim 1, further comprising a channel estimation module configured to remove phase shift and amplitude scaling in the received signal based on the pilot symbols embedded in the waveform.

10. The transceiver as claimed in claim 1, wherein the transceiver is configured for multiple input multiple output operation; wherein the antenna comprises a plurality of antennas; and further comprising:
    an Alamouti encoder configured to implement space-time block coding on the transmit signal.

11. The transceiver as claimed in claim 1, further comprising a transmission security encoder configured to encode at least some segments of the waveform with a pseudorandom security sequence.

12. The transceiver as claimed in claim 1, wherein the plurality of bandwidth channel segments includes a plurality of 1.2 MHz bandwidth channel segments.

13. The transceiver as claimed in claim 12, wherein the plurality of 1.2 MHz bandwidth channel segments includes up to six 1.2 MHz bandwidth channel segments.

14. A method of wireless communication in a radio transceiver network, the method comprising:
    receiving a signal to be transmitted by a radio transmitter in the network, the signal including data;
    modulating the signal to provide a modulated signal;

generating a packet-based waveform based on the modulated signal, the waveform operating over a plurality of bandwidth channel segments, each packet of the waveform comprising a preamble segment, a packet self discovery segment and a payload segment that includes the data, and each packet comprising a sequence of orthogonal frequency division multiplexed symbols, each symbol modulated onto one of the plurality of bandwidth channel segments;

defining, in the packet self discovery segment, a number of bandwidth channel segments within the plurality of bandwidth channel segments;

embedding pilot symbols within the payload segment of the waveform; and transmitting the waveform with the radio transmitter.

15. The method as claimed in claim 14, wherein generating the waveform includes generating the sequence of OFDM symbols by performing inverse fast Fourier transform (iFFTs)s on the modulated signal to generate each OFDM symbol as an iFFT.

16. The method as claimed in claim 15, wherein generating each OFDM symbol includes:

performing the inverse fast Fourier transform to generate the iFFT;

appending a cyclic prefix and a cyclic postfix to the iFFT to provide an extended iFFT; and multiplying the extended iFFT by a window function to generate the OFDM symbol.

17. The method as claimed in claim 16, wherein multiplying the extended iFFT by the window function includes multiplying the extended iFFT by a raised cosine window.

18. The method as claimed in claim 14, further comprising encoding at least come segments of the waveform with a pseudorandom security sequence prior to transmitting the waveform.

19. The method as claimed in claim 14, further comprising:

receiving the waveform with a radio receiver;

demodulating the waveform based at least in part on the number of bandwidth channel segments defined in the packet self discovery segment; and acquiring a time of arrival of the waveform at the radio transceiver by individually correlating each symbol of the preamble segment of the waveform to provide a series of correlations and summing the series of correlations.

20. The method as claimed in claim 19, further comprising determining a frequency error in the waveform received at the receiver, including computing a frequency error for each symbol in the preamble segment of the waveform based on average rotation vectors from symbol to adjacent symbol.

21. The method as claimed in claim 14, further comprising:

performing Alamouti space-time block coding on the waveform to provide a plurality of coded waveforms for transmission; and wherein transmitting the waveform includes transmitting the plurality of coded waveforms using a plurality of individual antennas.

22. The method as claimed in claim 14, wherein the plurality of bandwidth channel segments includes a plurality of 1.2 MHz bandwidth channel segments.

23. The method as claimed in claim 22, wherein the plurality of 1.2 MHz bandwidth channel segments includes up to six 1.2 MHz bandwidth channel segments.

* * * * *